US011696652B2

(12) United States Patent
Pacella

(10) Patent No.: US 11,696,652 B2
(45) Date of Patent: Jul. 11, 2023

(54) FOLDABLE PLAYARD

(71) Applicant: Wonderland Switzerland AG, Steinhausen (CH)

(72) Inventor: Jonathan M. Pacella, Gap, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 16/987,412

(22) Filed: Aug. 7, 2020

(65) Prior Publication Data

US 2021/0037990 A1    Feb. 11, 2021

Related U.S. Application Data

(60) Provisional application No. 62/883,716, filed on Aug. 7, 2019.

(51) Int. Cl.
*A47D 13/06* (2006.01)
*F16C 11/10* (2006.01)

(52) U.S. Cl.
CPC ............ *A47D 13/061* (2013.01); *F16C 11/10* (2013.01)

(58) Field of Classification Search
CPC .... A47D 13/06; A47D 13/061; A47D 13/063; A47D 13/065; A47D 13/066; A47D 13/068; F16C 11/10
See application file for complete search history.

(56) References Cited

U.S. PATENT DOCUMENTS

| | | | |
|---|---|---|---|
| 244,217 A | 7/1881 | Fenner |
| 406,715 A | 7/1889 | Fenner |
| 609,491 A | 8/1898 | Ashwell |
| 927,738 A | 7/1909 | Malaby |

(Continued)

FOREIGN PATENT DOCUMENTS

| | | |
|---|---|---|
| CN | 2682940 | 3/2005 |
| CN | 1572185 A | 10/2009 |

(Continued)

OTHER PUBLICATIONS

"International Search Report" dated Dec. 2, 2020 for International application No. PCT/EP2020/072290, International filing date:Aug. 7, 2020.

(Continued)

*Primary Examiner* — David R Hare
*Assistant Examiner* — George Sun
(74) *Attorney, Agent, or Firm* — Volpe Koenig

(57) ABSTRACT

A foldable playard includes a plurality of vertical tubes, a plurality of X-typed frames and a latching mechanism. Each vertical tube includes a bar member, a corner and a slider. The corner is affixed to top of the bar member. The slider is movably disposed on the bar member. Each of the X-typed frames is rotatably connected between two adjacent vertical tubes via the corner and the slider. The latching mechanism includes a latch body and a locking portion. The latch body includes a first end and a second end opposite to each other, and the first end being disposed on the corner of one vertical tube. The locking portion is disposed on the second end. The locking portion is adapted to engage with and disengage from one X-typed frame rotatably connected to the slider on the said vertical tube in response to motion of the latch body.

11 Claims, 15 Drawing Sheets

(56) References Cited

U.S. PATENT DOCUMENTS

| | | | |
|---|---|---|---|
| 1,264,078 | A | 4/1918 | Jaureguy |
| 2,243,984 | A | 6/1941 | Singewald |
| 2,471,540 | A | 5/1949 | Phillips |
| 2,624,054 | A | 1/1953 | Plant |
| 2,698,443 | A | 1/1955 | Ralick |
| 4,186,454 | A | 2/1980 | Cone |
| 4,651,367 | A | 3/1987 | Osher et al. |
| 4,790,340 | A | 12/1988 | Mahoney |
| 5,099,866 | A | 3/1992 | Solis et al. |
| 5,290,050 | A | 3/1994 | Kim |
| 5,517,707 | A | 5/1996 | Lamantia |
| 6,035,877 | A | 3/2000 | Losijr et al. |
| 6,067,676 | A | 5/2000 | Carnahan et al. |
| 6,231,119 | B1 | 5/2001 | Zheng |
| 6,438,773 | B1 | 8/2002 | Hsia |
| 6,467,107 | B1 | 10/2002 | Glover et al. |
| 6,865,756 | B2 * | 3/2005 | Clapper .............. A47D 13/063 5/98.1 |
| 6,915,545 | B2 | 7/2005 | Chen |
| 6,948,197 | B1 | 9/2005 | Chen |
| 7,096,874 | B2 | 8/2006 | Forshpan |
| 7,401,367 | B2 | 7/2008 | Gehr et al. |
| 7,418,746 | B2 | 9/2008 | Gehr et al. |
| 7,422,026 | B2 | 9/2008 | Kim |
| 7,458,115 | B2 | 12/2008 | Chen et al. |
| 7,568,243 | B2 | 8/2009 | Gehr et al. |
| 7,617,550 | B2 | 11/2009 | Gehr et al. |
| 7,752,693 | B2 | 7/2010 | Espenshade |
| 7,770,245 | B2 | 8/2010 | Cheng et al. |
| 7,891,369 | B2 | 2/2011 | Carter |
| 8,024,825 | B2 | 9/2011 | Harrison et al. |
| 8,388,501 | B2 | 3/2013 | Myers et al. |
| 8,973,180 | B2 | 3/2015 | Zeng et al. |
| 8,984,682 | B2 | 3/2015 | Zhao |
| 9,066,607 | B1 | 6/2015 | Ransil et al. |
| 9,089,225 | B2 | 7/2015 | Fiore, III et al. |
| 9,113,723 | B2 | 8/2015 | Gregor et al. |
| 9,144,325 | B1 * | 9/2015 | Sousa .............. A47D 13/063 |
| 9,345,339 | B2 | 5/2016 | Wang et al. |
| 9,770,118 | B2 | 9/2017 | Mountz |
| 9,955,801 | B2 | 5/2018 | Yu |
| 10,006,195 | B2 | 6/2018 | Matsuoka |
| 10,194,755 | B1 * | 2/2019 | Flannery .............. A47D 13/063 |
| RE47,525 | E | 7/2019 | Sousa et al. |
| 10,448,752 | B1 | 10/2019 | Flannery et al. |
| 10,674,835 | B1 | 6/2020 | Flannery et al. |
| 10,704,290 | B1 | 7/2020 | Flannery et al. |
| RE48,148 | E | 8/2020 | Wang et al. |
| 2004/0237191 | A1 * | 12/2004 | Clapper .............. A47D 13/063 5/98.1 |
| 2005/0150046 | A1 * | 7/2005 | Gehr .............. A47D 13/063 5/99.1 |
| 2006/0253980 | A1 | 11/2006 | Paesang et al. |
| 2007/0163041 | A1 | 7/2007 | Cheng et al. |
| 2007/0271697 | A1 | 11/2007 | Martin |
| 2008/0034498 | A1 | 2/2008 | Chen et al. |
| 2008/0098530 | A1 | 5/2008 | Chen et al. |
| 2008/0149157 | A1 | 6/2008 | Carter |
| 2008/0289103 | A1 | 11/2008 | Gehr et al. |
| 2008/0289673 | A1 | 11/2008 | Roden et al. |
| 2009/0019637 | A1 * | 1/2009 | Gehr .............. A47D 13/063 5/99.1 |
| 2009/0188540 | A1 | 7/2009 | Mallookis et al. |
| 2009/0217959 | A1 | 9/2009 | Carter |
| 2010/0139729 | A1 | 6/2010 | Carter |
| 2010/0229301 | A1 | 9/2010 | Arnold, IV et al. |
| 2012/0110730 | A1 | 5/2012 | Sousa et al. |
| 2013/0050975 | A1 | 2/2013 | Carpenter |
| 2013/0074257 | A1 | 3/2013 | Mendes et al. |
| 2013/0092207 | A1 | 4/2013 | Lovley, II et al. |
| 2014/0102497 | A1 | 4/2014 | Ma et al. |
| 2014/0165288 | A1 | 6/2014 | Wang et al. |
| 2014/0208505 | A1 | 7/2014 | Burkholder et al. |
| 2014/0359938 | A1 | 12/2014 | Burns et al. |
| 2015/0021453 | A1 | 1/2015 | Brassard et al. |
| 2015/0060605 | A1 | 3/2015 | Tserodze et al. |
| 2016/0066705 | A1 | 3/2016 | Yaacoby et al. |
| 2016/0242566 | A1 | 8/2016 | Tadipatri et al. |
| 2016/0369524 | A1 | 12/2016 | Huang |
| 2017/0290444 | A1 | 10/2017 | Mao |
| 2017/0367492 | A1 | 12/2017 | Thomson et al. |
| 2018/0014662 | A1 | 1/2018 | He et al. |
| 2018/0142493 | A1 | 5/2018 | Choi |
| 2018/0238075 | A1 | 8/2018 | Yang et al. |
| 2018/0332977 | A1 | 11/2018 | Sozzo |
| 2019/0200781 | A1 | 7/2019 | McGittigan |
| 2019/0338552 | A1 | 11/2019 | Jun |
| 2020/0002968 | A1 | 1/2020 | Ferrari et al. |
| 2020/0077807 | A1 | 3/2020 | Taylor et al. |
| 2020/0352353 | A1 * | 11/2020 | Fusco .............. A47D 13/061 |
| 2020/0407999 | A1 | 12/2020 | Huang |
| 2021/0040766 | A1 | 2/2021 | Sun et al. |

FOREIGN PATENT DOCUMENTS

| | | |
|---|---|---|
| CN | 100551304 C | 10/2009 |
| CN | 301602286 | 7/2011 |
| CN | 202858551 | 4/2013 |
| CN | 103859873 A | 9/2014 |
| CN | 204445034 | 7/2015 |
| CN | 204970498 U | 1/2016 |
| CN | 103156444 | 2/2016 |
| CN | 208676799 | 4/2019 |
| CN | 208973109 | 6/2019 |
| CN | 209331573 | 9/2019 |
| CN | 209331574 | 9/2019 |
| EP | 1911376 | 4/2008 |
| EP | 3088065 | 11/2017 |
| FR | 1053010 | 1/1954 |
| FR | 2361846 | 3/1978 |
| GB | 2471540 | 1/2011 |
| JP | 2019-30388 A | 2/2019 |
| WO | 82/01984 | 6/1982 |
| WO | 99/020160 | 4/1999 |
| WO | 2016/062164 A1 | 4/2016 |

OTHER PUBLICATIONS

"International Search Report" dated Oct. 15, 2020 for International application No. PCT/EP2020/072290, International filing date:Aug. 7, 2020.

International Search Report and Written Opinion dated Apr. 28, 2021 for PCT International Application No. PCT/US2020/063427.

International Search Report and Written Opinion dated Jun. 2, 2021 for PCT International Application No. PCT/US2021/013831.

Wash & Fold Portable Baby Circle. Nihon Ikuji. First found on Feb. 22, 2021. Last accessed at https://nihonikuji.com/item/araetetatameru_circle_cf/on Mar. 17, 2021.12 pages.

International Search Report and Written Opinion dated Mar. 12, 2021 for PCT International Application No. PCT/EP2020/083517.

OVERSTOCK(TM): "Overstock.com: Online Shopping—Bedding, Furniture, Electronics, Jewelry, Clothing & more", May 23, 2017 (May 23, 2017), XP055780628, Retrieved from the Internet <URL:https://www.overstock.com/Baby/Summer-Infant-Pop-N-Play-Shade-Canopy-Portable-Playard/10406172/product.html?utm_source=pinterest.com&utm_medium=referral&utm_campaign=pin_button> [retrieved on Mar. 1, 2021], Available at: https://web.archive.org/web/20160512031529/https://wwww.overstock.com/Baby/Summer-Infant-Pop-N-Play-Portable-Playard/9561718/product.html.

International Search Report and Written Opinion dated Oct. 14, 2021 for PCT International Application No. PCT/US2021/031634.

U.S. Appl. No. 62/883,716, filed Aug. 7, 2019.

U.S. Appl. No. 62/979,728, filed Feb. 21, 2020.

International Search Report and Written Opinion in International Patent Application No. PCT/US2020/063424 dated Mar. 9, 2021, 27 pages.

10 Best Baby Playpens 2018. Ezvid Wiki Apr. 13, 2018 Youtube. Accessed at https://www.youtube.com/watch?u=qzvuGglUma48't=99s. 1 page.

(56) References Cited

OTHER PUBLICATIONS

2017 Hot Sale Indoor and Outdoor Foldable Baby Safety Fence Playpen. Ningbo Sunnuo International Trade Co. First found on Oct. 30, 2020. Last accessed at http://sunnuotrade.waimaotong.com/product/2017-Hot-Sale-Indoor-and-Dutdoor-Foldable-Baby-Safety-Fence-Playpen_m1227918m.html on Mar. 17, 2021. 6 pages.
5 Comfiest Playpens and Playards for Your Child's Rest and Play. Cool Things Youtube Jun. 8, 2019. Accessed at hittps://www.youtube.com/watch?v=rTcyfrHr6Ao&t=42s. 1 page.
Baby Delight Go With Me Nod Travel Crib Product Page. Baby Delight. First found on Feb. 4, 2021. Last accessed at https://babydelight.com/product/go-with-me-nod-deluxe-portable-travel-crib-charcoal-tweed/ on Mar. 17, 2021. 11 pages.
Baby Delight Go with Me Nod Deluxe Portable Travel Crib. Target. First found on Feb. 1, 2021. Last accessed at https://www.target.com/p/baby-delight-go-with-me-nod-deluxe-portable-travel-crib/-/A-80369220#Ink=sametab on Mar. 17, 2021.8 pages.
Baby Delight Go With Me Nod JPMA 2019. Albee Baby Youtube Apr. 29, 2019. Accessed at https://www.youtube.com/watch?v=OsbKtzVEL-8&t=5s. 1 page.
Cove Aire Instructions. Nuna created Dec. 10, 2019. 15 pages.
Deluxe Foldaway Playpen. Koo Di. First found on Oct. 30, 2020. Last accessed at https://koo-di.com/products/deluxe-foldaway-playpen on Mar. 17, 2021. 3 pages.
Evenflo Play-Away Portable Playard Deluxe, Wayfarer. Evenflo Walmart. First found on Jul. 15, 2020. Last accessed at https://www.walmart.com/ip/Evenflo-Play-Away-Portable-Playard-Deluxe-Wayfarer/154959146 on Mar. 17, 2021. 8 pages.
Go With Me Nod Travel Crib Care & Instructions. Baby Delight 2018. Accessed at https://mkObabydelightbwx00d.kinstacdn.com/wp-content/uploads/2019-10-27_BD05350_GWM-Nod-Travel-CribUB.pdf. 8 pages.
Hexa Playpen. Tutti Bambini. First found on Oct. 30, 2020. Last accessed at https://www.tuttibambini.com/hexaplaypen-grey.html on Mar. 17, 2021.4 pages.
How to Set Up a Nuna SENA Aire Travel Crib—Babylist. Babylist Youtube Jul. 4, 2018. Accessed at https://www.youtube.com/watch?v=y4NoFgd_10M&t=35s. 1 page.
International Search Report and Written Opinion in International Patent Application No. PCT/EP2020/072290 dated Dec. 2, 2020, 22 pages.
Jetsetter Playard Owner's Manual. Graco Apr. 2015. 44 pages.
Nuna COVET Aire Travel Crib. Pottery Barn Kids. First found on Jan. 11, 2021. Last accessed at https://www.potterybaraids.com/products/nuna-cove-aire-travel-crib/on Mar. 17, 2021. 2 pages.
Nuna Sena Playard Review - Baby Gizmo. Baby Gizmo Youtube Jan. 21, 2013. Accessed at https://www.youtube.com/watch?v=UHN7nsyE7gs&t=20s. 1 page.
Onyx Playpen User Manual. Dream On Me created Oct. 10, 2019. 1 page.
Onyx Playpen. Dream on Me. First found on Aug. 12, 2020. Last accessed at https://dreamonme.com/products/Baby-gears/playpens-playards/onyx-playpen/ on Mar. 18, 2021.3 pages.
Pack 'n Play® On the Go TM Playard with Folding Bassinet. Graco. First found on Jan. 11, 2021. Last accessed at hittps://www.gracobaby.com/home-and-gear/pack-n-play-playards-and-bassinets/pack-n-play-playards/pack-n-play-onhe-go-playard-with-folding-bassinet/SAP_2120159.html on Mar. 17, 2021.4 pages.
Pack 'n Play Care Suite Bassinet Playard Owner's Manual. Graco Jun. 2020. 32 pages.
Pack'n Play On the Go Playard Owner's Manual. Graco Apr. 30, 2020. 28 pages.
Pack'n Play On the Go Playard Owner's Manual. Graco Jun. 2011. 28 pages.
Pack 'n Play Sport Playard Owner's Manual. Graco Dec. 12, 2014. 20 pages.
Pack 'n Play® Sport Playard. Graco. First found on Jul. 15, 2020. Last accessed at https://www.gracobaby.com/home-and-gear/pack-n-play-playards-and-bassinets/pack-n-play-playards/pack-n-play-sport-playard/SAP_1926867.html on Mar. 17, 2021.
Pop 'N Play® Lite Playard. Summer Infant, Inc. First found on Jul. 15, 2020. Last accessed at https://www.summerinfant.com/all-safety-health/pop-%E2%80%98n-play-lite-playard on Mar. 17, 2021. 5 pages.
Pop 'N Play LITE Playard Owner's Manual. Summer Infant, Inc. Nov. 4, 2019.2 pages.
Portable Playard Play Pen for Infants and Babies. Babyseater. First found on Jul. 15, 2020. Last accessed at https://babyseaterus/product/portable-playard-play-pen-for-infants-and-babies-lightweight-mesh-baby-playpen-with-carryingaase-easily-opens-with-1-hand-turquoise/ on Mar. 17, 2021.8 pages.
Portable Playpen. Deryan. First found on Oct. 30, 2020. Last accessed at https://deryan.shop/en/product/portableplaypen/ on Mar. 17, 2021.3 pages.
Portable Playpen. MTWML Amazon. First found on Oct. 30, 2020. Last accessed at https://www.amazon.sg/Portable-Playpen-Foldable-Washable-Lightweight/dp/B07XKYPYHH on Mar. 17, 2021. 3 pages.
Quick Connect Portable Seat Playard Owner's Manual. Graco Nov. 2019.40 pages.
Sena Aire Instructions. Nuna created Feb. 8, 2017. 23 pages.
Sena Aire Instructions. Nuna Jul. 2019. 13 pages.
Sena Aire Mini Product Page. Nuna. First found on Jan. 11, 2021. Last accessed at https://www.nunababy.com/usa/sena-aire-mini on Mar. 17, 2021.8 pages.
Sena Aire Product Page. Nuna. First found on Jan. 11, 2021. Last accessed at https://www.nunababy.com/en/ on Mar. 17, 2021.7 pages.
Sena Product Page. Nuna. First found on Jan. 11, 2021. Last accessed at https://www.nunababy.com/en/sena on Mar. 17, 2021.8 pages.
Sunnuo 2019 Foldable Baby Safety Fence Playpen. Sunnuo Mar. 31, 2019. Accessed at Wayback machine at http://www.sunnuotrade.com/product/60697008483305426022/2019_Hot_Sale_Indoor_and_Outdoor Foldable_Baby_Safety_Fence_Playpen.html. 9 pages.
Venture All Stars JOY Foldable Playpen. Venture UK. First found on Oct. 30, 2020. Last accessed at https://www.ventureuk.com/product/venture-all-stars-joy-baby-playpen-grey/ on Mar. 18, 2021.3 pages.
Office Action issued in Taiwanese Application No. 111119166 dated Mar. 9, 2023.

\* cited by examiner

FOLDABLE PLAYARD

CROSS REFERENCE TO RELATED APPLICATIONS

This application claims the benefit of U.S. provisional application No. 62/883,716 which was filed on Aug. 7, 2019. The disclosures of the prior application is incorporated herein by reference in its entirety.

BACKGROUND OF THE INVENTION

1. Field of the Invention

The present invention relates to a foldable playard, and more particularly, to a foldable playard having a simple and easy-to-operate function and a safe and effective operation.

2. Description of the Prior Art

There are various means of latching the X-typed frame of the conventional playard via the tubular members pivoted and arranged in a crossed pattern. The conventional latching operation of the X-typed frame is complicated and costly due to numerous components, or requires multiple steps for the consumer to fold and unfold the X-typed frame of the playard. Therefore, design of a foldable playard having a simple and easy-to-operate function and a safe and effective operation is an important issue in the related mechanical design industry.

SUMMARY OF THE INVENTION

The present invention provides a foldable playard having a simple and easy-to-operate function and a safe and effective operation for solving above drawbacks.

According to the claimed invention, a foldable playard includes a plurality of vertical tubes, a plurality of X-typed frames and a latching mechanism. Each vertical tube includes a bar member, a corner, and a slider. The corner is affixed to top of the bar member. The slider is movably disposed on the bar member. Each of the X-typed frames is rotatably connected between two adjacent vertical tubes via the corner and the slider. The latching mechanism includes a latch body and a locking portion. The latch body includes a first end and a second end opposite to each other, and the first end being disposed on the corner of one vertical tube. The locking portion is disposed on the second end. The locking portion is adapted to engage with and disengage from one X-typed frame rotatably connected to the slider on the said vertical tube in response to motion of the latch body.

According to the claimed invention, the latch body is a flexible latch affixed to the corner, engagement and disengagement of the locking portion and the said X-typed frame is actuated by deformation of the flexible latch.

According to the claimed invention, the locking portion is an arc structure, and a dimension of the arc structure is matched with a diameter of the X-typed frame.

According to the claimed invention, the locking portion is a hook structure adapted to hold a bottom surface of the said X-typed frame.

According to the claimed invention, the latch body is a rotatable latch pivoted to the corner, engagement and disengagement of the locking portion and the said X-typed frame is actuated by rotation of the rotatable latch.

According to the claimed invention, the locking portion is a crook structure adapted to catch the said X-typed frame.

According to the claimed invention, the latching mechanism further includes a releasing portion disposed on the second end and adapted to be applied by an external force for actuating the latch body.

According to the claimed invention, the latching mechanism further includes a lead-in portion connected to the locking portion and adapted to slidably contact against the X-typed frame for bending the latch body.

According to the claimed invention, the locking portion includes a first locking structure, and the X-typed frame comprises a second locking structure detachably locking with the first locking structure.

According to the claimed invention, the first locking structure is a cavity and the second locking structure is an extrusion, or the first locking structure is the extrusion and the second locking structure is the cavity.

According to the claimed invention, a foldable playard includes a plurality of vertical tubes, a plurality of X-typed frames and a latching mechanism. Each vertical tube includes a bar member, a corner and a slider. The corner is affixed to top of the bar member. The slider is movably disposed on the bar member. Each of the X-typed frames includes an inner member and an outer member crossed to each other and is rotatably connected between two adjacent vertical tubes via the corner and the slider. The latching mechanism includes a first housing, a second housing and a locking gear. The first housing has a first engaging portion and a first locking portion, and the first engaging portion is engaged with the outer member. The second housing has a second engaging portion, and is rotatably assembled with the first housing. The second engaging portion is engaged with the inner member. The locking gear has a second locking portion, and is movably disposed between the first housing and the second housing. The first locking portion and the second locking portion are engaged with and disengaged from each other in response to motion of the locking gear.

According to the claimed invention, the latching mechanism further includes a resilient component disposed between the second housing and the locking gear, and a resilient recovering force of the resilient component pushes the locking gear toward the first housing for engaging the first locking portion with the second locking portion.

According to the claimed invention, the latching mechanism further includes a releasing portion movably disposed on the first housing, and a protrusion of the releasing portion detachably inserts into a hole on the first housing to separate the second locking portion from the first locking portion.

According to the claimed invention, the inner member and the outer member are pivoted to rotate the second housing relative to the first housing via the first engaging portion and the second engaging portion, so as to align the second locking portion with the first locking portion.

According to the claimed invention, a foldable playard includes a plurality of vertical tubes, a plurality of X-typed frames and a latching mechanism. Each vertical tube includes a bar member, a corner and a slider. The corner is affixed to top of the bar member. The slider is movably disposed on the bar member. Each of the X-typed frames is rotatably connected between two adjacent vertical tubes via the corner and the slider. The latching mechanism includes a latch body and an actuator. The latch body is movably disposed on one X-typed frame and adapted to engage with and disengage from a cavity formed on the bar member of one vertical tube. The actuator is coupled to the latch body and disposed on the X-typed frame and adapted to be actuated by an external force for moving the latch body relative to the bar member.

According to the claimed invention, the latching mechanism further includes a resilient component, and two ends of the resilient component are respectively connected to the X-typed frame and the latch body.

According to the claimed invention, the said X-typed frame is pivoted to the slider of the said vertical tube via a shaft, and the latch body comprises a track assembled with the shaft in a slidable and rotatable manner.

According to the claimed invention, the latch body is protruded from the said X-typed frame to insert into the cavity, and is disposed inside the said X-typed frame to separate from the cavity.

According to the claimed invention, a foldable playard includes a plurality of vertical tubes, a plurality of X-typed frames and a latching mechanism. Each vertical tube includes a bar member, a corner and a slider. The corner is affixed to top of the bar member. The slider is movably disposed on the bar member. Each of the X-typed frames is rotatably connected between two adjacent vertical tubes via the corner and the slider. The latching mechanism includes a latch body and a locking portion. The latch body is affixed to one X-typed frame and rotatably assembled with the slider of one vertical tube. The locking portion is stretched from the latch body. The locking portion is adapted to engage with and disengage from the slider in response to rotation of the latch body relative to the slider.

According to the claimed invention, the latching mechanism further includes a releasing portion disposed on the locking portion and adapted to be applied by an external force for deforming the locking portion.

According to the claimed invention, a notch is formed on a bottom surface of the slider, and the locking portion is flexible to engage with and disengage from the notch.

According to the claimed invention, a foldable playard includes a plurality of vertical tubes, a plurality of X-typed frames and a latching mechanism. Each vertical tube includes a bar member, a corner and a slider. The corner is affixed to top of the bar member. The slider is movably disposed on the bar member. Each of the X-typed frames is rotatably connected between two adjacent vertical tubes via the corner and the slider. The latching mechanism includes a latch body and a locking portion. The latch body includes a first end and a second end opposite to each other, and the first end is affixed to the slider of one vertical tube. The locking portion is disposed on the second end. The locking portion is adapted to engage with and disengage from the corner of the said vertical tube in response to deformation of the latch body.

According to the claimed invention, the latching mechanism further includes a releasing portion disposed on the second end and adapted to be applied by an external force for bending the latch body.

According to the claimed invention, the corner includes a locked portion matched with the locking portion of the latching mechanism, the locking portion is a notch and the locked portion is a protrusion, or the locking portion is the protrusion and the locked portion is the notch.

According to the claimed invention, a foldable playard includes a plurality of vertical tubes, a plurality of X-typed frames and a latching mechanism. Each vertical tube includes a bar member, a corner and a slider. The corner is affixed to top of the bar member. The slider is movably disposed on the bar member. Each of the X-typed frames includes an inner member and an outer member crossed to each other and rotatably connected between two adjacent vertical tubes via the corner and the slider. The latching mechanism includes a latch body and a locking portion. The latch body includes a first end and a second end opposite to each other, and the first end being disposed on the inner member of one X-typed frame. The locking portion is disposed on the second end. The locking portion is adapted to engage with and disengage from the outer member of the said X-typed frame in response to motion of the latch body.

Structural relation between the vertical tube and the X-typed frame in the unfolded mode and the parallel mode are suitable for all embodiments of the foldable playard in the present invention. Arrangement of the latching mechanism of each embodiment can be different from the latching mechanism of other embodiments in accordance with the design demand. In the first embodiment, the foldable playard disposes the latching mechanism on the corner of the vertical tube, and the latching mechanism can be bent and deformed to utilize the arc structure of the locking portion to engage with and disengage from the X-typed frame. In the second embodiment, the foldable playard disposes the latching mechanism on the corner of the vertical tube for engaging with and disengaging from the X-typed frame; however, the locking portion of the latching mechanism can be shaped as the hook structure, rather than the arc structure in the first embodiment. In the third embodiment, the foldable playard disposes the latching mechanism on the corner of the vertical tube for engaging with and disengaging from the X-typed frame, and the latch body of the latching mechanism can be bent and deformed to engage with and disengage from the locking portion and the X-typed frame, which means the cavity of the locking portion can lock or unlock the extrusion of the X-typed frame.

In the fourth embodiment, the foldable playard disposes the latching mechanism on the corner of the vertical tube, and the latch body of the latching mechanism can be rotated and utilize the crook structure of the locking portion to engage with and disengage from the X-typed frame. In the fifth embodiment, the foldable playard disposes the latching mechanism on the X-typed frame, to lock and unlock rotation between the inner member and the outer member of the X-typed frame, so as to unfold and fold the foldable playard. In the sixth embodiment, the foldable playard disposes the latching mechanism on the X-typed frame for engaging with and disengaging from the vertical tube, and the latch body of the latching mechanism is slidably disposed inside the X-typed frame.

In the seventh embodiment, the foldable playard disposes the latching mechanism on the X-typed frame for engaging with and disengaging from the vertical tube, and the latch body of the latching mechanism is rotatably disposed on the X-typed frame. In the eighth embodiment, the foldable playard disposes the latching mechanism on the slider for engaging with and disengaging from the corner of the vertical tube, so as to constrain or release constraint between the slider and the corner. In the ninth embodiment, the foldable playard disposes the latching mechanism on one member of the X-typed frame, and the latching mechanism can be engaged with another member of the X-typed frame to constrain rotation of the X-typed frame and the movement of the slider relative to the bar member. In conclusion, the latching mechanism of the present invention can provide a simple and easy-to-operate function for the foldable playard, and the latching mechanism can provide a safe and effective operation for folding and unfolding the foldable playard.

These and other objectives of the present invention will no doubt become obvious to those of ordinary skill in the art

DETAILED DESCRIPTION

Figure 1:
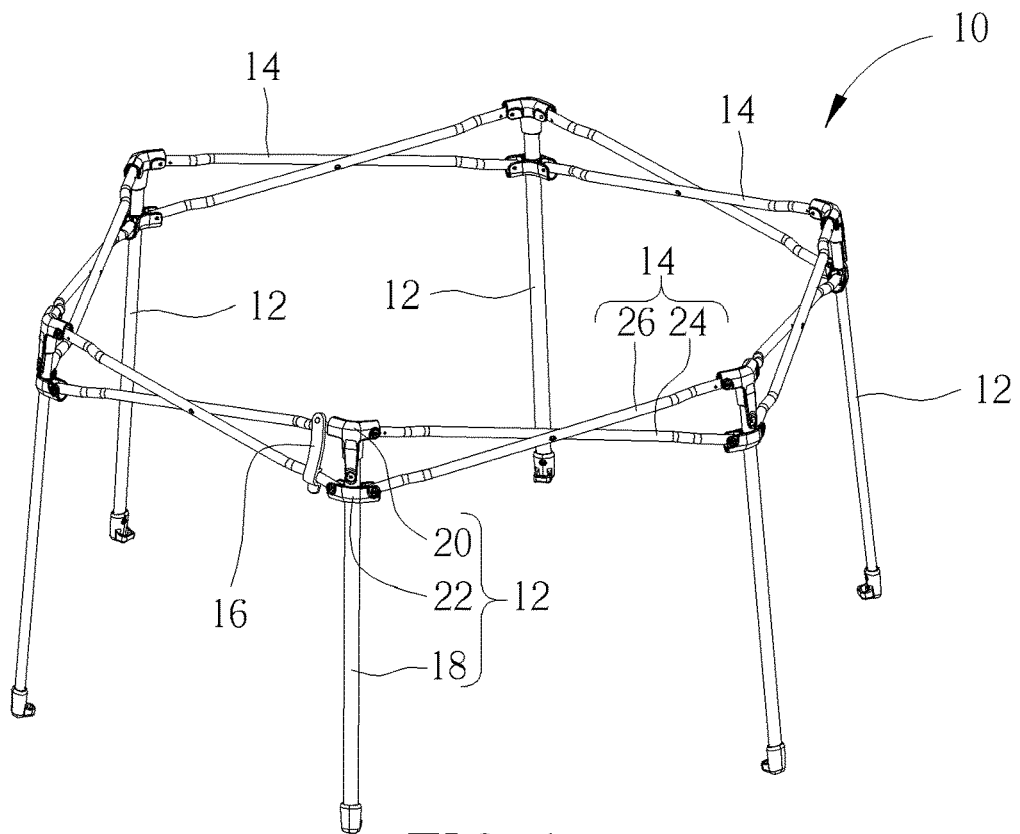
FIG. 1 is a diagram of a foldable playard in an unfolded mode according to a first embodiment of the present invention.
Figure 2:
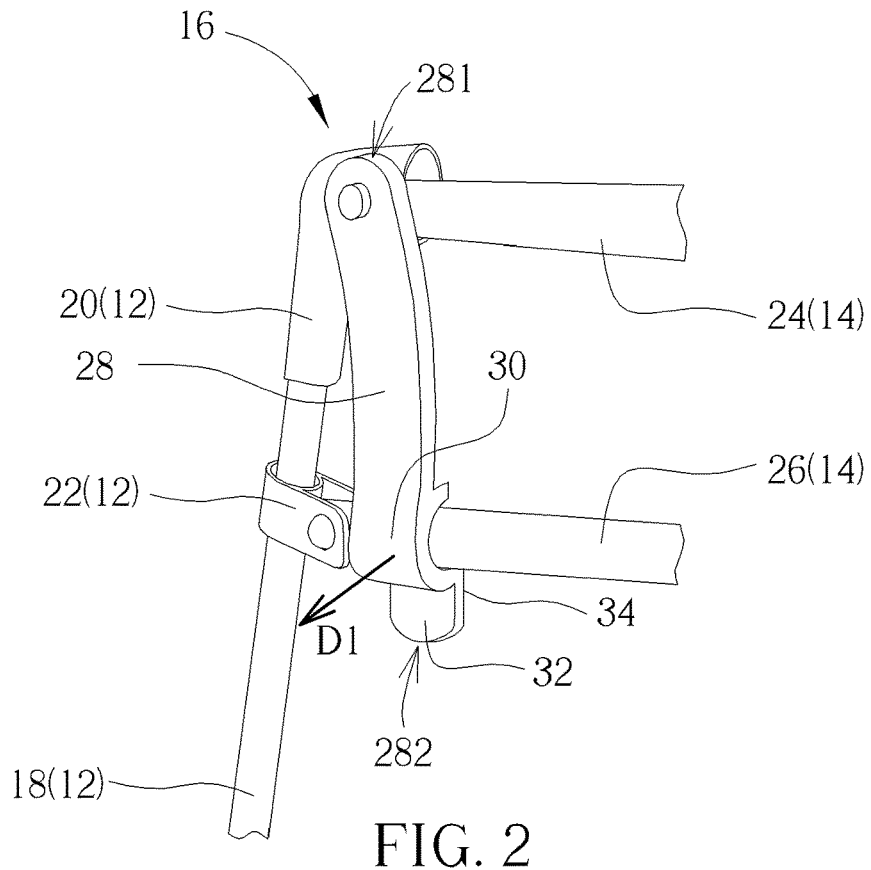
FIG. 2 is a diagram of a part of the foldable playard in a locking mode according to the first embodiment of the present invention.
Figure 3:
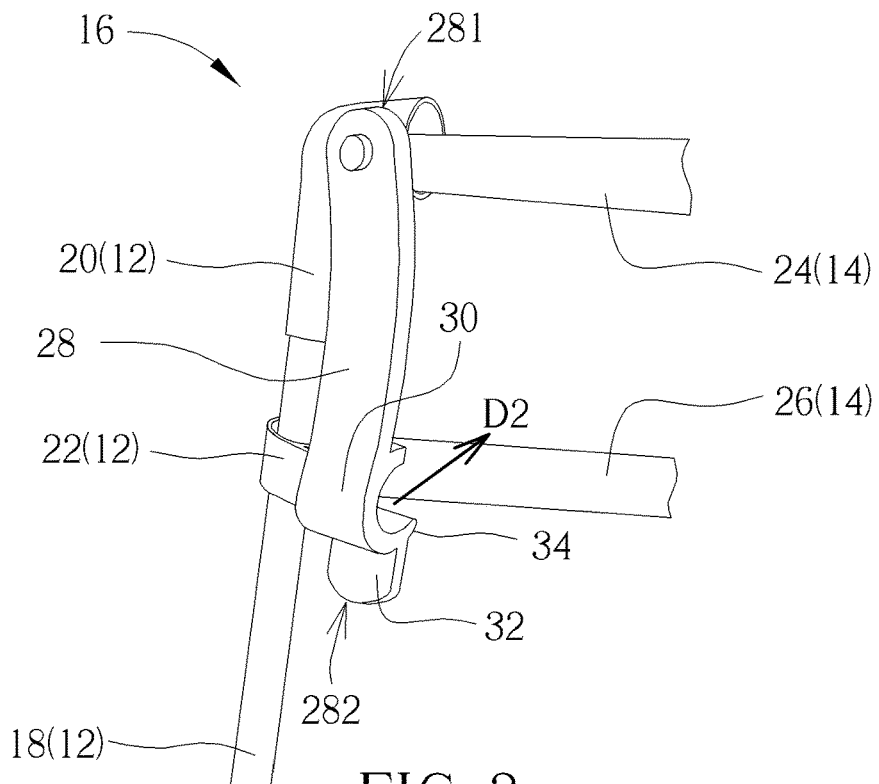
FIG. 3 is a diagram of a part of the foldable playard in an unlocking mode according to the first embodiment of the present invention.
Figure 4:
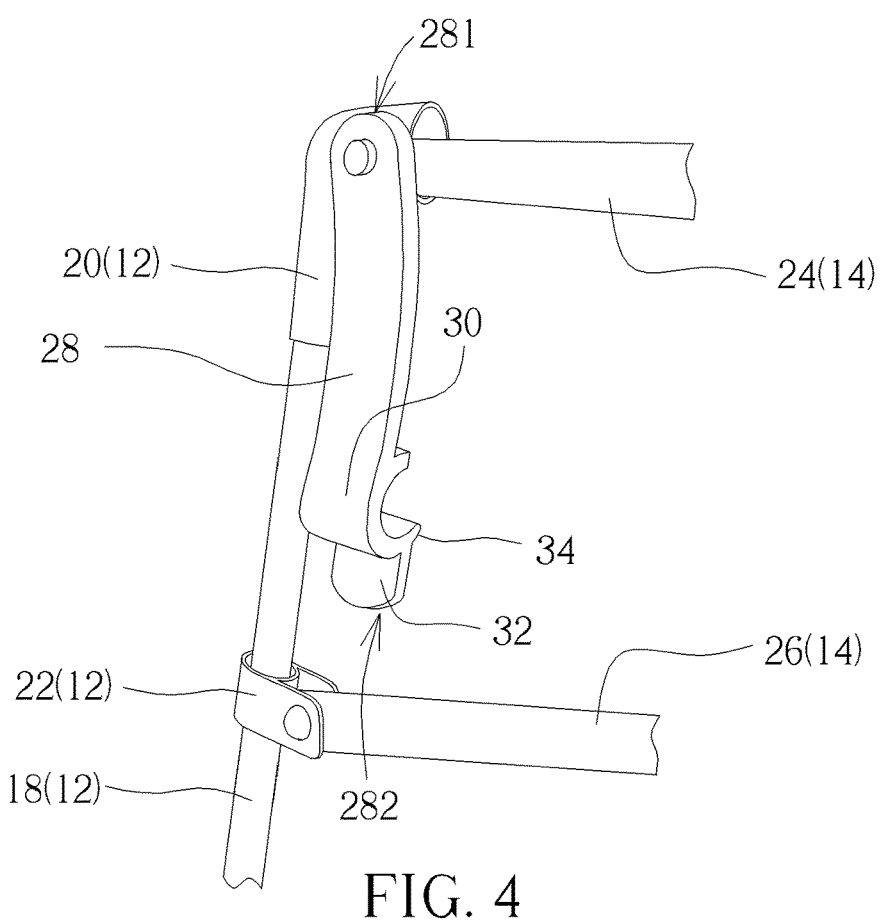
FIG. 4 is a diagram of a part of the unlocked foldable playard switched to a parallel mode according to the first embodiment of the present invention.

Please refer to FIG. 1 to FIG. 4. FIG. 1 is a diagram of a foldable playard 10 in an unfolded mode according to a first embodiment of the present invention. FIG. 2 to FIG. 4 are diagrams of a part of the foldable playard 10 in different operation modes according to the first embodiment of the present invention. The foldable playard 10 can be assembled with textile products to form an enclosed space, to provide a protected playground for a child. The foldable playard 10 can include a plurality of vertical tubes 12, a plurality of X-typed frames 14 and a latching mechanism 16. Each vertical tube 12 can include a bar member 18, a corner 20 and a slider 22. The corner 20 and a slider 22 can be parts of the vertical tube 12, or can be represented as elements independent of the vertical tube 12.

The corner 20 can be affixed to top of the bar member 18. The slider 22 can be movably disposed on the bar member 18. Each X-typed frame 14 can include an inner member 24 and an outer member 26 crossed to each other, and rotatably connected between two adjacent vertical tubes 12 via the corner 20 and the slider 22. The foldable playard 10 can be switched between the unfolded mode and a parallel mode (which means a folded mold). The foldable playard 10 in the parallel mode can be shown in following FIG. 24 As shown in FIG. 1, if the slider 22 is upward moved close to the corner 20, the inner member 24 and the outer member 26 are set as an X-typed form, and the foldable playard 10 can be fixed in the unfolded mode to provide the protected playground. If the slider 22 is downward moved relative to the bar member 18, the inner member 24 is rotated in a clockwise direction and the outer member 26 is rotated in a counterclockwise direction, and therefore the bar member 18, the inner member 24 and the outer member 26 can be nearly parallel, so the foldable playard 10 can be fixed in the parallel mode.

As shown in FIG. 2 to FIG. 4, the latching mechanism 16 can include a latch body 28, a locking portion 30, a releasing portion 32 and a lead-in portion 34. The latch body 28 can include a first end 281 and a second end 282 opposite to each other. The first end 281 can be disposed on the corner 20 of the vertical tube 12 via pivoting connection or rigid connection. In a possible situation, the first end 281 may be optionally disposed on an upper section of the vertical tube 12, such as top of the bar member 18. The locking portion 30 can be disposed on the second end 282, and used to engage with and disengage from the X-typed frame 14 in a detachable manner when the latch body 28 is pressed or bent. For example, the latch body 28 can be bent in a first direction D1 to disengage the locking portion 30 from the X-typed frame 14, such as a locking mode in FIG. 2 to an unlocking mode in FIG. 3; the latch body 28 can be pressed in a second direction D2 to engage the locking portion with the X-typed frame 14, such as the unlocking mode in FIG. 3 to the locking mode in FIG. 2. The releasing portion 32 can be disposed on the second end 282 and adjacent to the locking portion 30, and be pressed by an external force to bend the latch body 28 for disengaging the locking portion 30 from the X-typed frame 14. The lead-in portion 34 can be connected to the locking portion 30, and used to slidably contact against the X-typed frame 14 when the X-typed frame 14 is upward moved relative to the vertical tube 12 via the slider 22, for guiding the latch body 28 bent and deformed, so as to lock the latching mechanism 16 with the X-typed frame 14.

In the first embodiment shown in FIG. 2 to FIG. 4, the latch body 28 can be a flexible latch affixed to the corner 20. The latch body 28 can be deformed and bent to actuate engagement and disengagement of the locking portion 30 and the X-typed frame 14. Besides, the locking portion 30 can be an arc structure, and a dimension (such as radian measure) of the arc structure can be similar to a diameter (such as the radian measure) of the X-typed frame 14; therefore, the latching mechanism 16 can be engaged with the X-typed frame 14 in a tight fit manner and still can be easily disengaged from the X-typed frame 14 by pressing the releasing portion 32 and bending the latch body 28. After the latching mechanism 16 is disengaged from the X-typed frame 14, the slider 22 can be downward moved relative to the bar member 18, so as to rotate the inner member 24 and the outer member 26 of the X-typed frame 14 into the nearly parallel mode, and the foldable playard 10 can be folded for easy storage. If the foldable playard 10 is prepared to unfold, the slider 22 can be upward moved relative to the bar member 18, and the lead-in portion 34 can guide the locking portion 30 of the latching mechanism 16 to lock with the X-typed frame 14, so that motion of the X-typed frame 14 relative to the vertical tube 12 is constrained, and the foldable playard 10 can be fixed in the unfolded mode.

It should be mentioned that the foldable playard 10 has no separate top rail that is parallel to the ground when the foldable playard 10 is in the unfolded mode. The X-typed frame 14 is disposed on an upper section of the vertical tubes 12, and thus the inner member 24 and the outer member 26 can be optionally served as the top rail.

Figure 5:
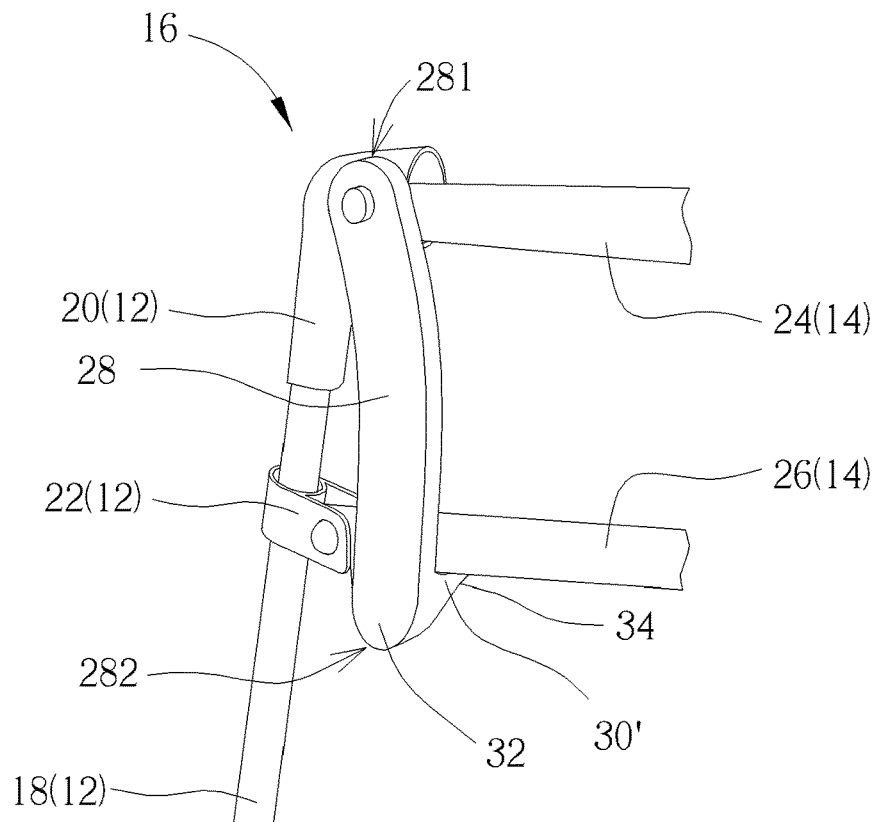
FIG. 5 is a diagram of a part of the foldable playard in the locking mode according to a second embodiment of the present invention.
Figure 6:
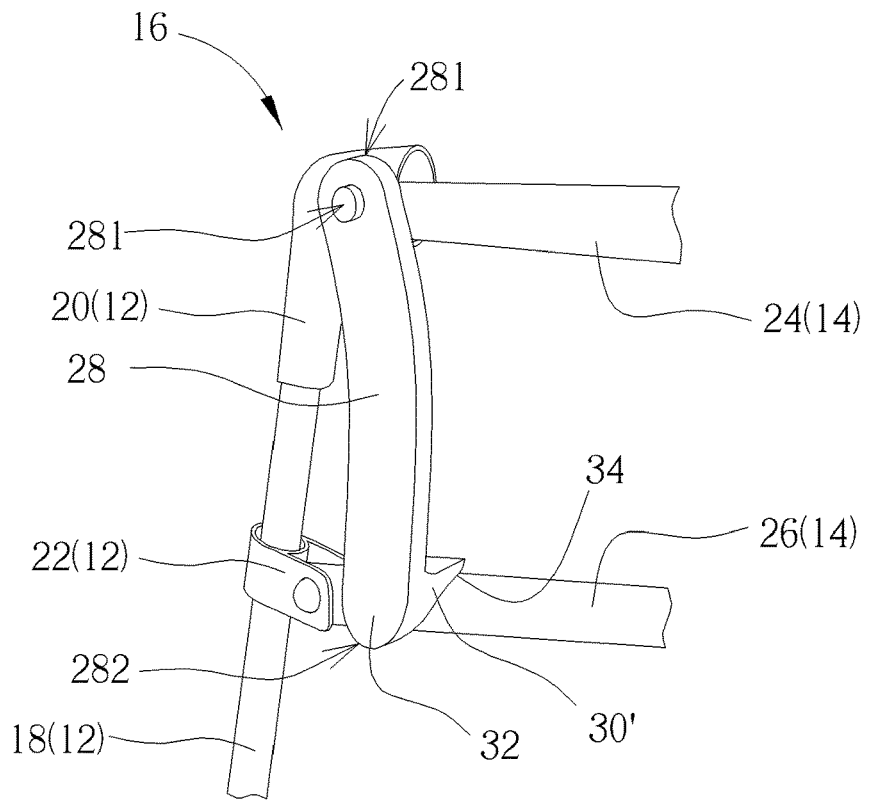
FIG. 6 is a diagram of a part of the foldable playard in the unlocking mode according to the second embodiment of the present invention.

Please refer to FIG. 1, FIG. 5 and FIG. 6. FIG. 5 and FIG. 6 are diagrams of a part of the foldable playard 10 in different operation modes according to a second embodiment of the present invention. In the second embodiment, elements having the same numerals have the same structures and functions as the first embodiment, and a detailed description is omitted herein for simplicity. In this second embodiment, the latching mechanism 16 of the second embodiment can include the locking portion 30' shaped as a hook structure, and the hook structure is used to hold a bottom surface of the X-typed frame 14. A taper underneath the hook structure can be set as the releasing portion 32 of the latching mechanism 16 in the second embodiment, and a lateral surface of the taper adjacent to the X-typed frame 14 can be set as the lead-in portion 34 of the latching mechanism 16. Operation of folding and unfolding the foldable playard 10 in the second embodiment is similar to the foldable playard 10 in the first embodiment, and a detailed description is omitted herein for simplicity.

Figure 7:
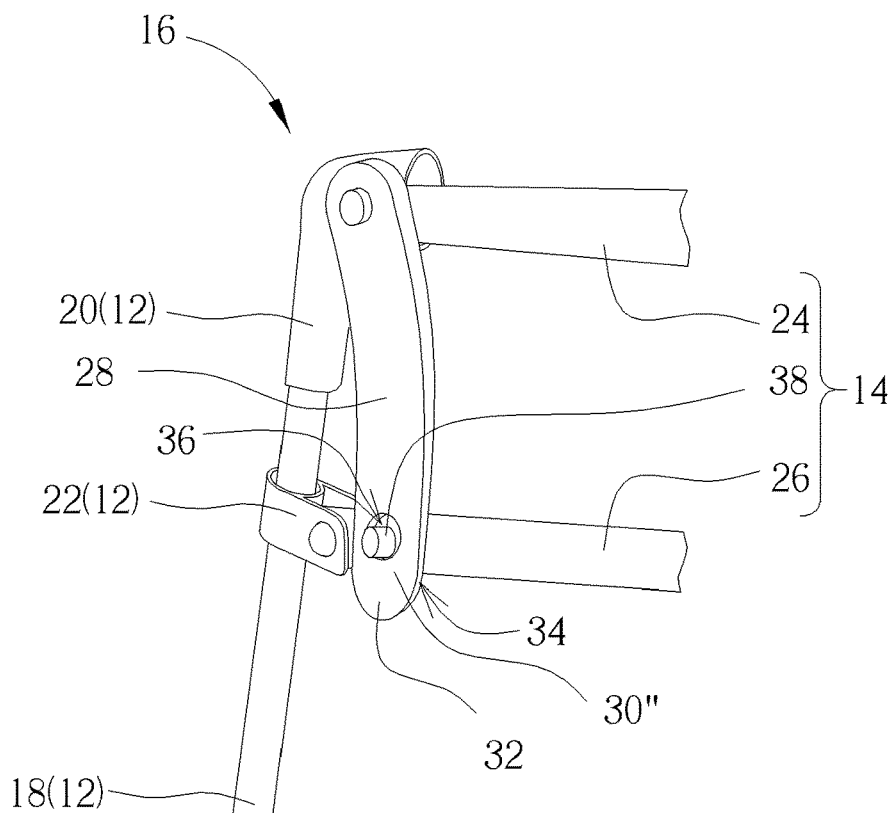
FIG. 7 is a diagram of a part of the foldable playard in the locking mode according to a third embodiment of the present invention.
Figure 8:
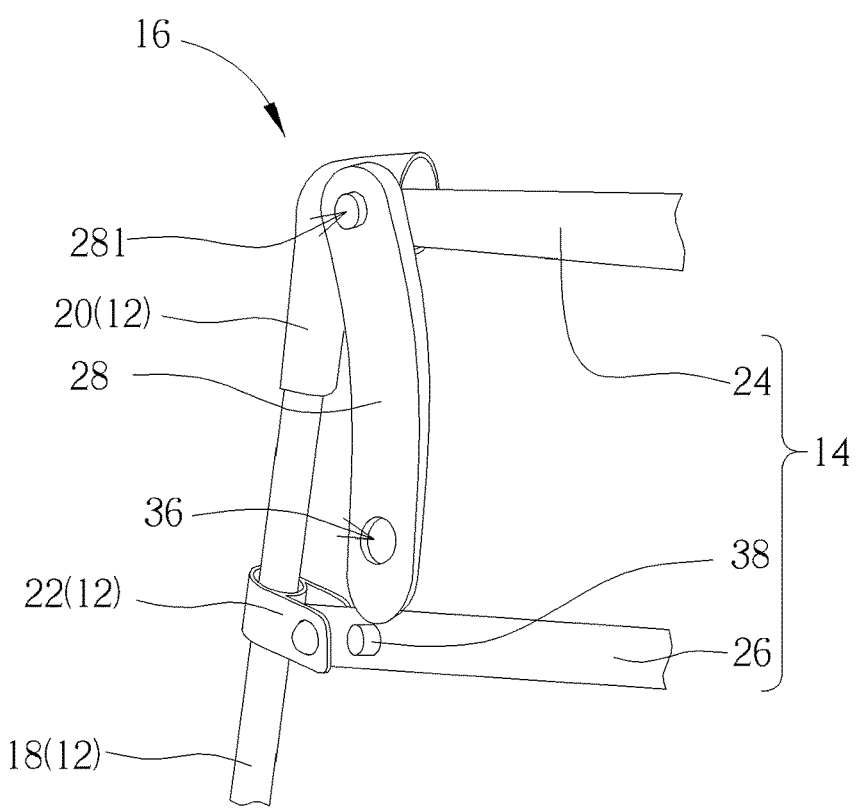
FIG. 8 is a diagram of a part of the foldable playard in the unlocking mode according to the third embodiment of the present invention.

Please refer to FIG. 1, FIG. 7 and FIG. 8. FIG. 7 and FIG. 8 are diagrams of a part of the foldable playard 10 in different operation modes according to a third embodiment of the present invention. In the third embodiment, elements having the same numerals have the same structures and functions as the foresaid embodiments, and a detailed description is omitted herein for simplicity. The latching mechanism 16 of the third embodiment does not clip the X-typed frame 14 (which means the first embodiment) nor buckle the X-typed frame 14 (which means the second embodiment). In this third embodiment, the latching mechanism 16 of the third embodiment can include the locking portion 30" having a first locking structure 36, and the X-typed frame 14 can include a second locking structure 38 accordingly. The first locking structure 36 can lock with the second locking structure 38 in a detachable manner for constraining a relative movement between the vertical tube 12 and the X-typed frame 14. The first locking structure 36 and the second locking structure 38 respectively can be a cavity and an extrusion. The extrusion inserts into the cavity to constrain a relative movement between the latching mechanism 16 and the X-typed frame 14. The latching mechanism 16 can be pressed and deformed by the external force, to separate the extrusion from the cavity, and then the X-typed frame 14 can be moved relative to the vertical tube 12 and the latching mechanism 16 freely. Structures of the first locking structure 36 and the second locking structure 38 can be designed according to the design demand; for example, the first locking structure 36 and the second locking structure 38 can be circular forms, hexagonal forms or oval forms. Operation of folding and unfolding the foldable playard 10 in the third embodiment is similar to the foldable playard 10 in the foresaid embodiment, and a detailed description is omitted herein for simplicity.

Figure 9:
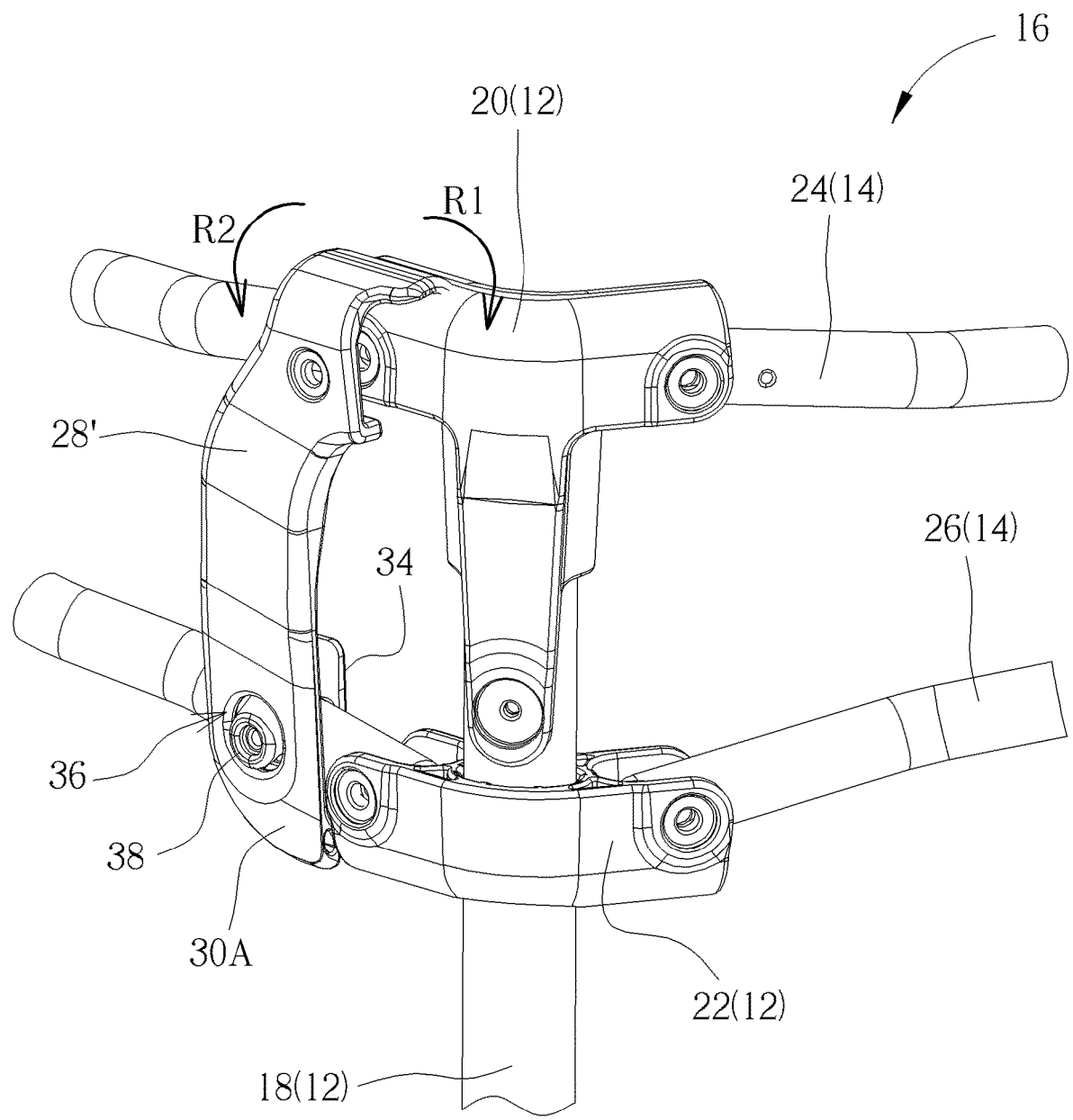
FIG. 9 is a diagram of a part of the foldable playard according to a fourth embodiment of the present invention.

Please refer to FIG. 1 and FIG. 9. FIG. 9 is a diagram of a part of the foldable playard 10 according to a fourth embodiment of the present invention. In the fourth embodiment, elements having the same numerals have the similar structures and functions to the foresaid embodiments, and a detailed description is omitted herein for simplicity. For example, the lead-in portion 34 has an inclined surface capable of slidably abutting against the X-typed frame 14 to deform the latch body 28', and the second locking structure 38 can be the extrusion for inserting into the first locking structure 36 designed as the cavity. In this fourth embodiment, the latching mechanism 16 of the fourth embodiment can include the latch body 28' designed as a rotatable latch, and the rotatable latch can be pivoted to the corner 20 of the vertical tube 12; further, the latching mechanism 16 may include the locking portion 30A designed as a crook structure. The crook structure may have two parts connected to each other in a bending manner; two opposite lateral surfaces of the member of the X-typed frames 14 are clipped by the two parts, and a bottom surface of the member of the X-typed frames 14 is held by connection between the two parts. The latch body 28' can be rotated relative to the corner 20 in a clockwise direction R1 or in a counterclockwise direction R2, and the locking portion 30A can catch or be separated from the X-typed frame 14 accordingly, so as to constrain or allow the relative movement between the vertical tube 12 and the X-typed frame 14. In the fourth embodiment, the latch body 28' is preferably rotated in the clockwise direction R1; however, if there is an adequate gap between the latch body 28' and the vertical tube 12 (by changing a shape of the latch body 28' or the corner 20 or the slider 22), the latch body 28' can be rotated in the counterclockwise direction R2 for engagement and disengagement. Besides, a fixing component (such as a rivet, a blot or a screw) can be optionally set to connect the latch body 28' and the corner 20, and an interval may exist between the latch body 28' and the corner 20 accordingly. Operation of folding and unfolding the foldable playard 10 in the fourth embodiment is similar to the foldable playard 10 in the foresaid embodiment, and a detailed description is omitted herein for simplicity.

As shown in FIG. 9, it should be mentioned that the latching mechanism 16 and the X-typed frame 14 in the fourth embodiment may optionally utilize the extrusion and the cavity for engagement and disengagement, such as the third embodiment; however, an actual application for the engagement and the disengagement is not limited to the foresaid means.

Figure 10:
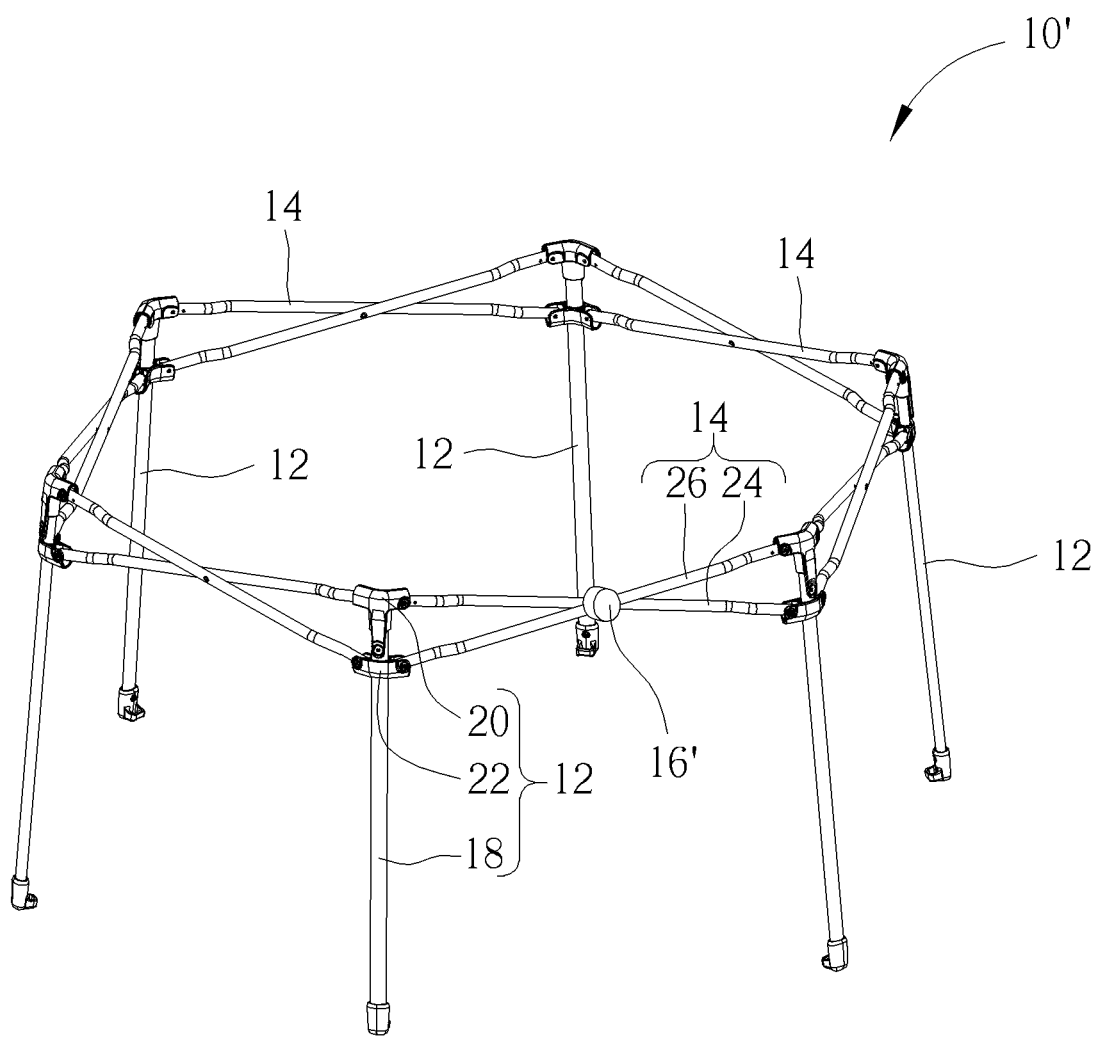
FIG. 10 is a diagram of the foldable playard according to a fifth embodiment of the present invention.
Figure 11:
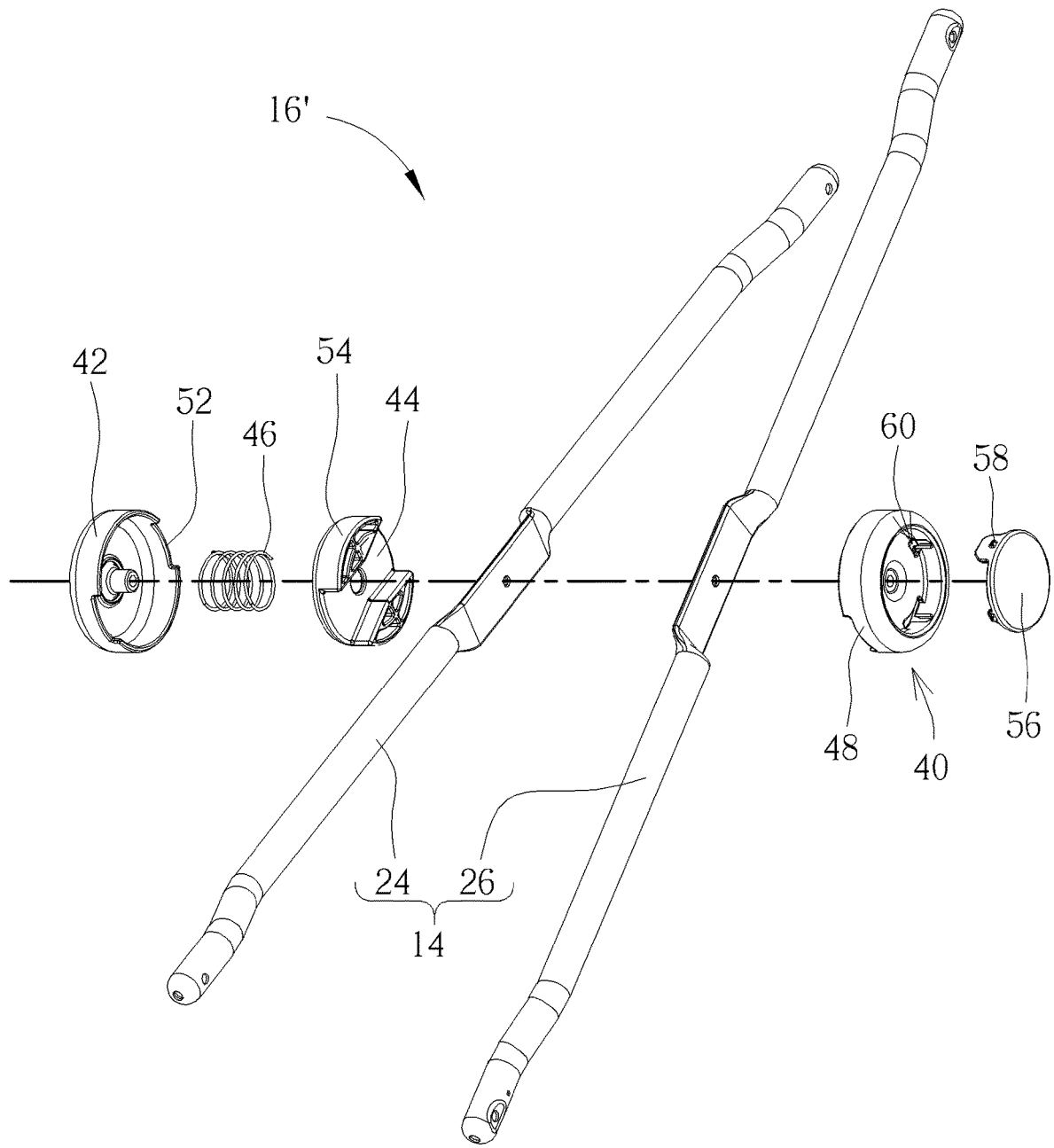
FIG. 11 is an exploded diagram of a part of the foldable playard according to the fifth embodiment of the present invention.
Figure 12:
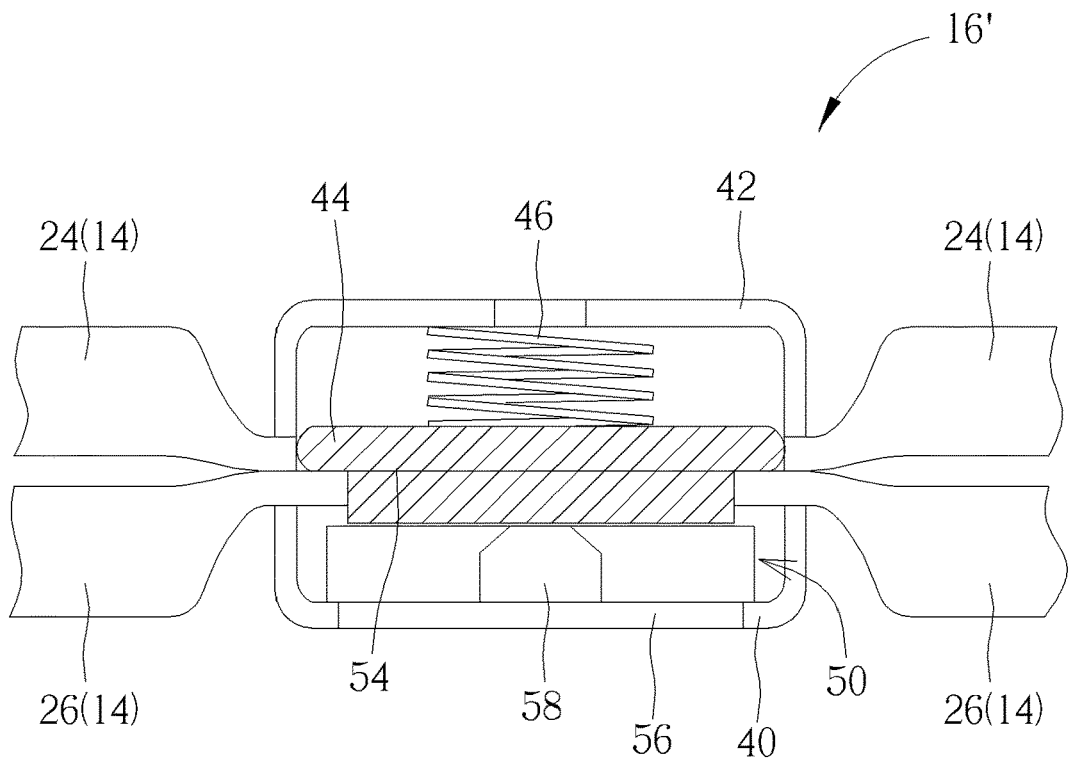
FIG. 12 is a lateral view of the part of the foldable playard in the locking mode according to the fifth embodiment of the present invention.
Figure 13:
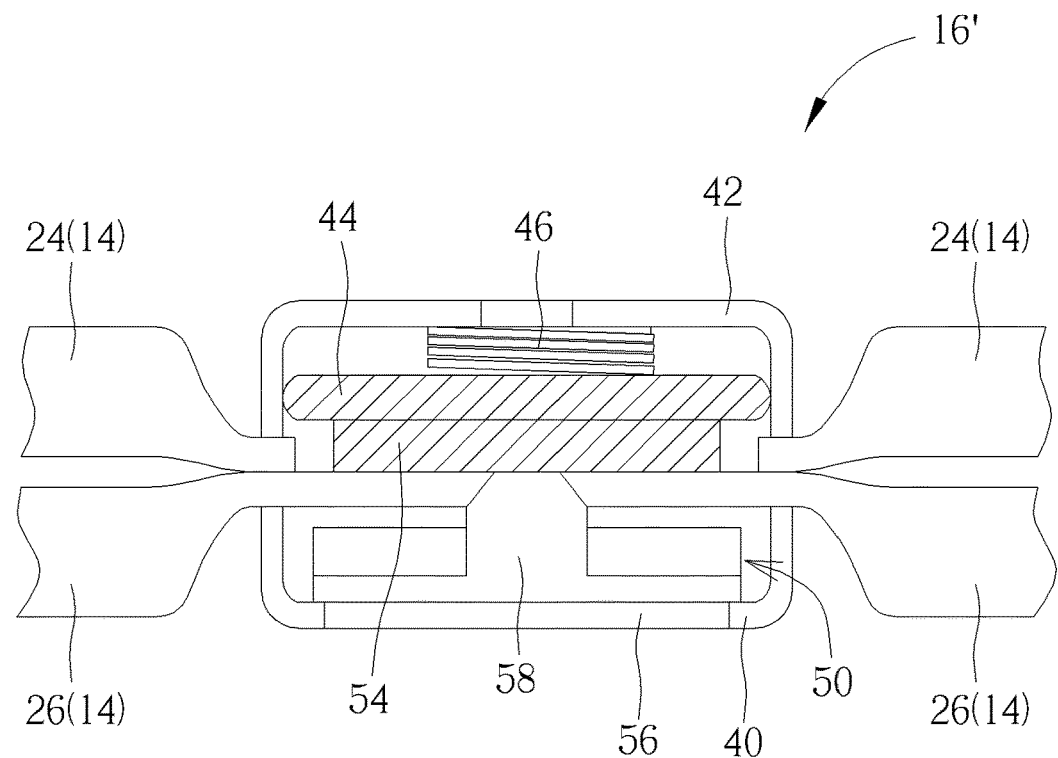
FIG. 13 is a lateral view of the part of the foldable playard in the unlocking mode according to the fifth embodiment of the present invention.
Figure 24:
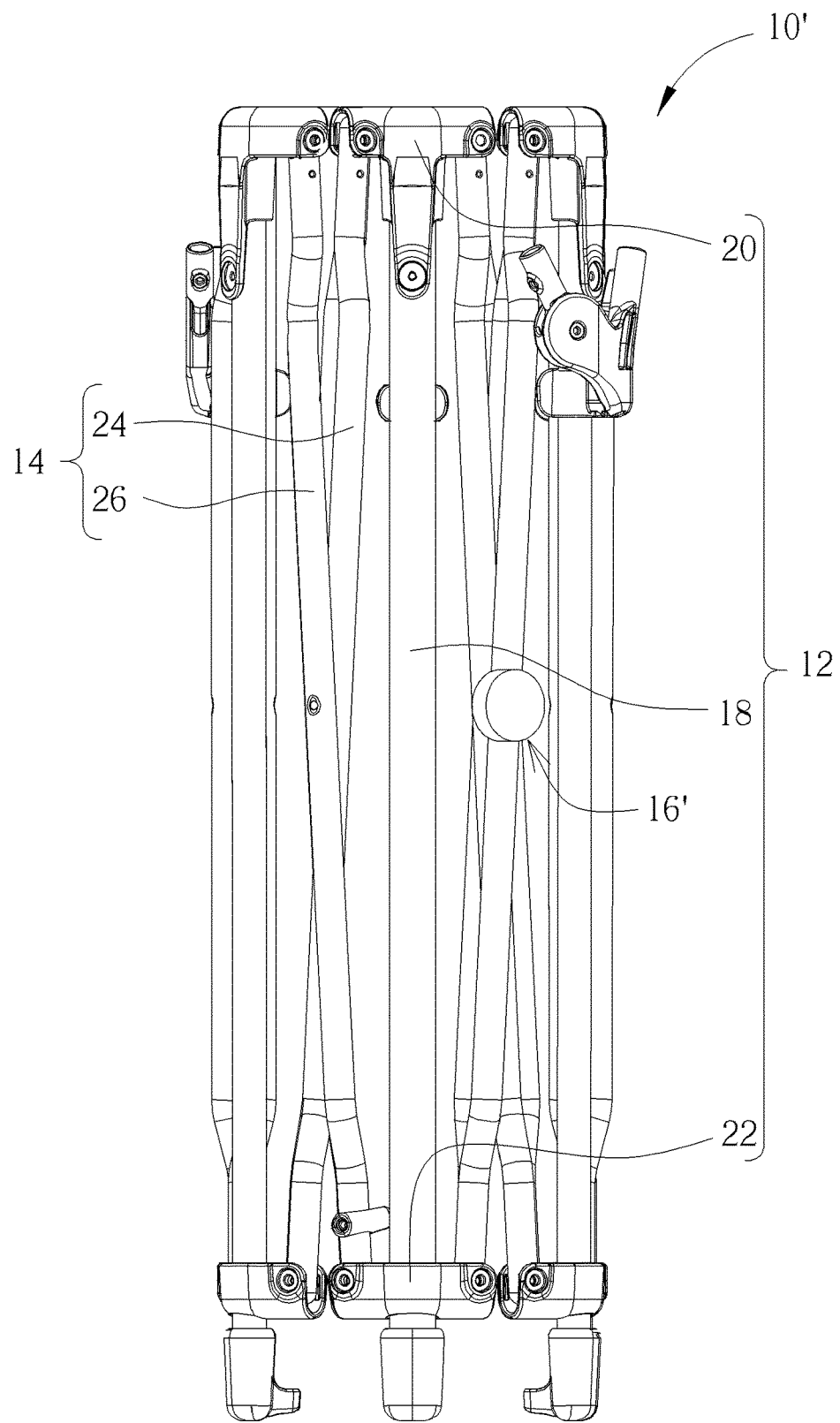
FIG. 24 is a diagram of the foldable playard in a parallel mode according to the fifth embodiment of the present invention.

Please refer to FIG. 10 to FIG. 13 and FIG. 24. FIG. 10 is a diagram of the foldable playard 10' according to a fifth embodiment of the present invention. FIG. 11 is an exploded diagram of a part of the foldable playard 10' according to the fifth embodiment of the present invention. FIG. 12 and FIG. 13 are lateral views of the part of the foldable playard 10' in different operation modes according to the fifth embodiment of the present invention. FIG. 24 is a diagram of the foldable playard 10' in the parallel mode according to the fifth embodiment of the present invention. In the fifth embodiment, elements having the same numerals have the same structures and functions as the foresaid embodiments, and a detailed description is omitted herein for simplicity. The foldable playard 10' can include the plurality of vertical tubes 12, the plurality of X-typed frames 14 and the latching mechanism 16'. The latching mechanism 16' can be disposed on a crossed section of the X-typed frame 14. A thickness of the latching mechanism 16' preferably can be similar to an overlapped dimension of the inner member 24 and the outer member 26, so that an outward appearance of the foldable playard 10' can be flattened in the unfolded mode and the parallel mode.

As shown in FIG. 11 to FIG. 13, the latching mechanism 16' can include a first housing 40, a second housing 42, a locking gear 44 and a resilient component 46. The first housing 40 can have a first engaging portion 48 and a first locking portion 50. The first engaging portion 48 can be a sunken structure formed on an edge of the first housing 40 and used to engage with the outer member 26. The first locking portion 50 (which is shown in FIG. 12 and FIG. 13) can be a cavity structure formed inside a main body of the first housing 40 and used to lock with the locking gear 44. The second housing 42 can be rotatably assembled with the first housing 40, and have a second engaging portion 52 used to engage with the inner member 24. The second engaging portion 52 can be the sunken structure formed on an edge of the second housing 42, which may be similar to the first engaging portion 48.

The locking gear 44 can be movably disposed between the first housing 40 and the second housing 42. The locking gear 44 can have a second locking portion 54, and the second locking portion 54 can be designed as a protruding structure fitted with the cavity structure of the first locking portion 50. The inner member 24 and the outer member 26 can be disposed between the first housing 40 and the locking gear 44. The inner member 24 can be rotated relative to the outer member 26 when the second locking portion 54 is separated from the first locking portion 50 to allow rotation between the first housing 40 and the locking gear 44, and the inner member 24 cannot be rotated relative to the outer member 26 when the second locking portion 54 inserts into the first locking portion 50. The resilient component 46 can be disposed between the second housing 42 and the locking gear 44. The resilient component 46 can be a compression spring. A resilient recovering force of the resilient component 46 can push the locking gear 44 toward the first housing 40, for keeping engagement of the first locking portion 50 and the second locking portion 54.

The latching mechanism 16' may have a releasing portion 56 movably disposed on the first housing 40, and a protrusion 58 of the releasing portion 56 can be detachably inserted into a hole 60 on the first housing 40. If the releasing portion 56 is moved into a concave portion of the first housing 40, the protrusion 58 can inset into the hole 60 to push the second locking portion 54 away from the first locking portion 50, and then the locking gear 44 can be rotated relative to the first housing 40, so that the inner member 24 can be rotated relative to the outer member 26. If an external force applied to the releasing portion 56 is removed, the resilient recovering force of the resilient component 46 can push the locking gear 44 to lock the second locking portion 54 with the first locking portion 50, and then the protrusion 58 can be removed from the hole 60, so that the releasing portion 56 can be departed from the concave portion of the first housing 40.

When the first locking portion 50 and the second locking portion 54 are unlocked, the inner member 24 and the outer member 26 can be pivoted via assembly of the first housing 40 and the second housing 42, and the slider 22 can be slid downward for preparing to fold or unfold the foldable playard 10. If the slider 22 is slid upward to pivot the inner member 24 and the outer member 26, the second housing 42 and the locking gear 44 can be rotated relative to the first housing 40; if the second locking portion 54 aligns with the first locking portion 50, the resilient component 46 can push the second locking portion 54 of the locking gear 44 to lock with the first locking portion 50 of the first housing 40, so as to constrain the relative rotation between the inner member 24 and the outer member 26, and the foldable playard 10 can be fixed in the unfolded mode.

Figure 14:
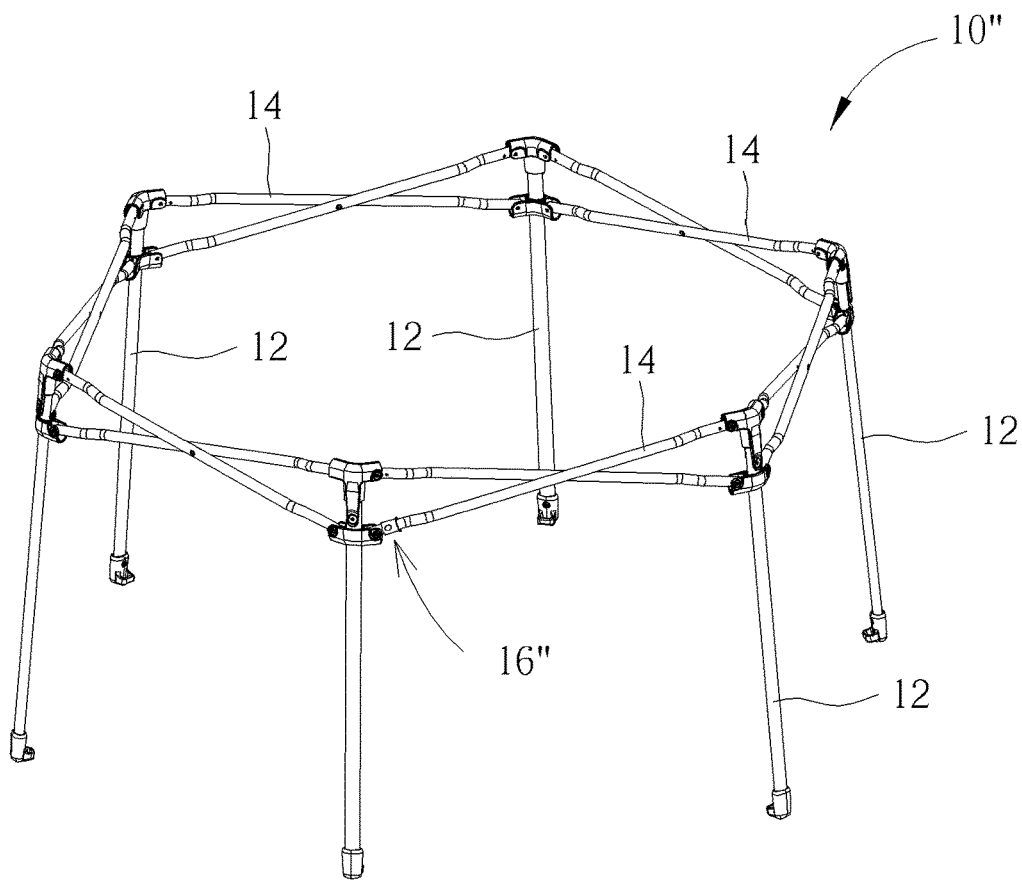
FIG. 14 is a diagram of the foldable playard according to a sixth embodiment of the present invention.
Figure 15:
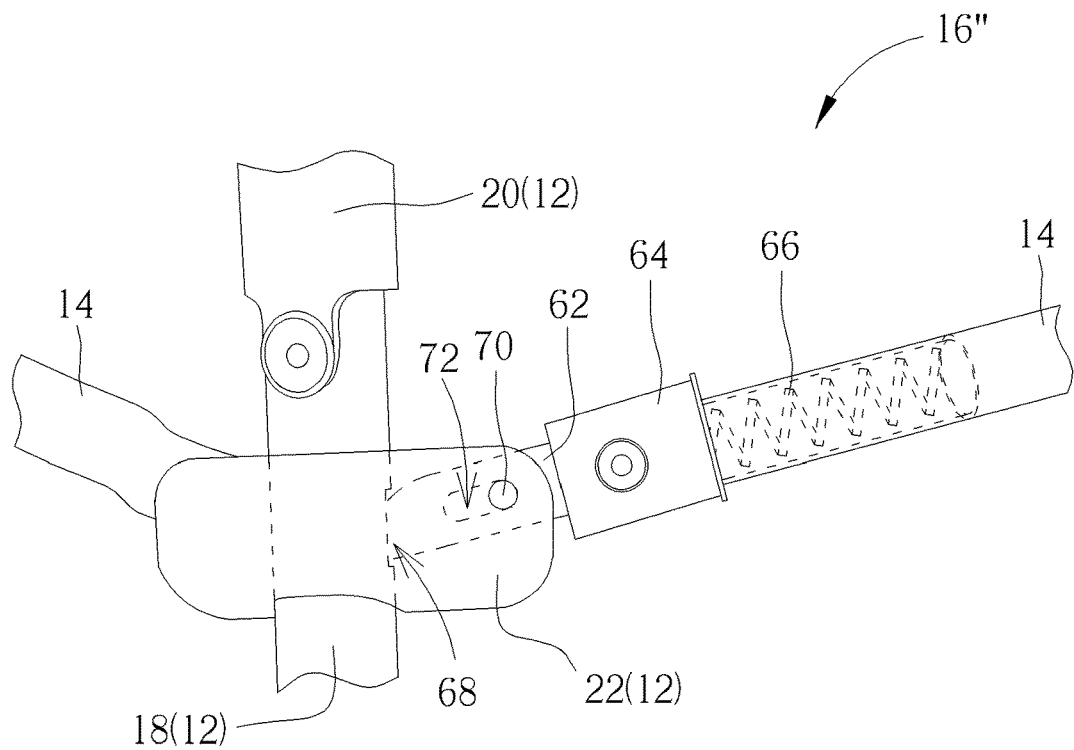
FIG. 15 is a diagram of a part of the foldable playard in the locking mode according to the sixth embodiment of the present invention.
Figure 16:
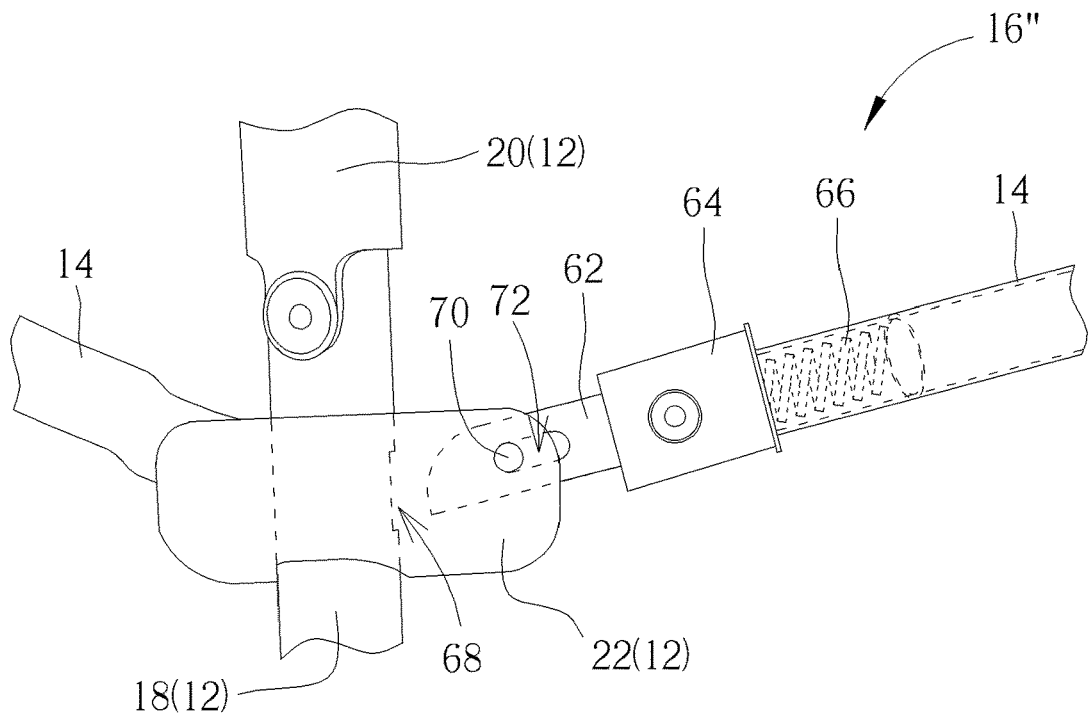
FIG. 16 is a diagram of a part of the foldable playard in the unlocking mode according to the sixth embodiment of the present invention.
Figure 17:
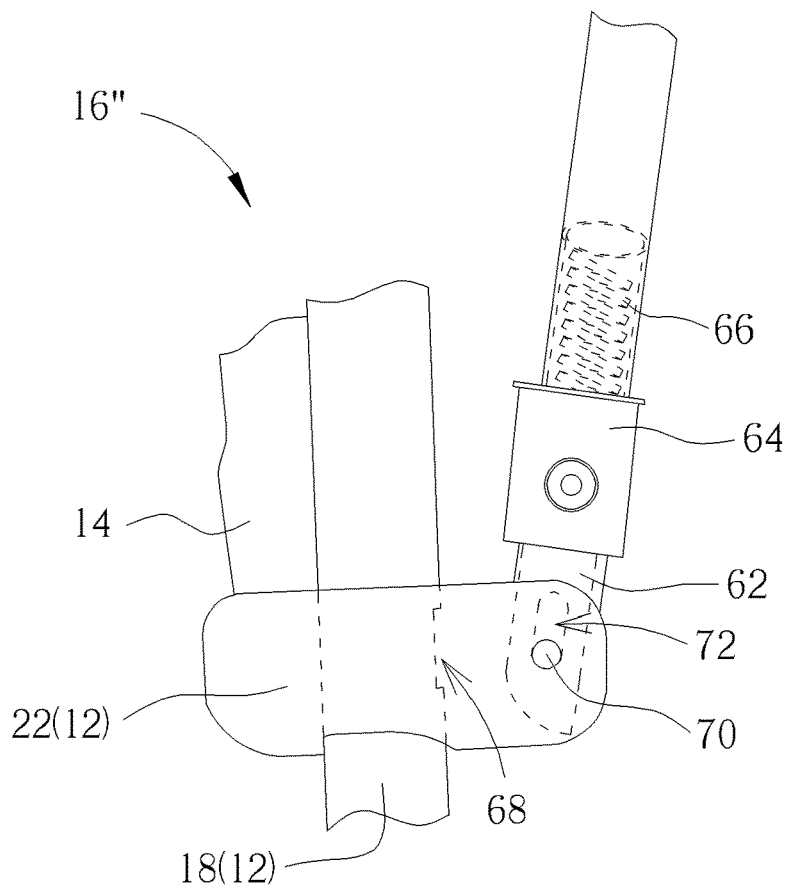
FIG. 17 is a diagram of a part of the unlocked foldable playard switched to the parallel mode according to the sixth embodiment of the present invention.

Please refer to FIG. 14 to FIG. 17. FIG. 14 is a diagram of the foldable playard 10" according to a sixth embodiment of the present invention. FIG. 15 to FIG. 17 are diagrams of a part of the foldable playard 10" in different operation modes according to the sixth embodiment of the present invention. In the sixth embodiment, elements having the same numerals have the same structures and functions as the foresaid embodiments, and a detailed description is omitted herein for simplicity. The foldable playard 10" can include the plurality of vertical tubes 12, the plurality of X-typed frames 14 and the latching mechanism 16". The latching mechanism 16" can be disposed on connection between the X-typed frame 14 and the slider 22.

As shown in FIG. 15 and FIG. 16, the latching mechanism 16" can include a latch body 62, an actuator 64 and a resilient component 66. The resilient component 66 can be a compression spring. The latch body 62 can be movably disposed on the X-typed frame 14, such as inside the member of the X-typed frame 14. The actuator 64 can be coupled to the latch body 62 and slidably disposed on the X-typed frame 14. When the actuator 64 is pushed relative to the member of the X-typed frame 14 by the external force or a resilient recovering force of the resilient component 66, the latch body 62 can be moved simultaneously. The resilient component 66 can be disposed between the X-typed frame 14 and the latch body 62. The resilient recovering force of the resilient component 66 can push the latch body 62 to engage with a cavity 68 formed on the bar member 18 of the vertical tube 12. The actuator 64 can be moved backward relative to the bar member 18 by the external force to disengage the latch body 62 from the cavity 68 of the bar member 18, and the resilient component 66 can be compressed to store the resilient recovering force; meanwhile, the X-typed frame 14 can be rotated relative to the vertical tube 12 for folding the foldable playard 10".

As shown in FIG. 16 and FIG. 17, the X-typed frame 14 can be pivoted to the slider 22 of the vertical tube 12 via a shaft 70, and the latch body 62 can have a track 72 assembled with the shaft 70 in a slidable and rotatable manner. Assembly of the shaft 70 and the track 72 can allow rotation of the X-typed frame 14 and the latching mechanism 16" relative to the slider 22 of the vertical tube 12. Therefore, the latch body 62 can protrude from the X-typed frame 14 and insert into the cavity 68 of the bar member 18 for constraining rotation between the vertical tube 12 and the X-typed frame 14, and the foldable playard 10" can be fixed in the unfolded mode. If the latch body 62 is separated from the cavity 68 and disposed inside the member of the X-typed frame 14, the X-typed frame 14 can be rotated relative to the vertical tube 12 for folding the foldable playard 10".

Figure 18:
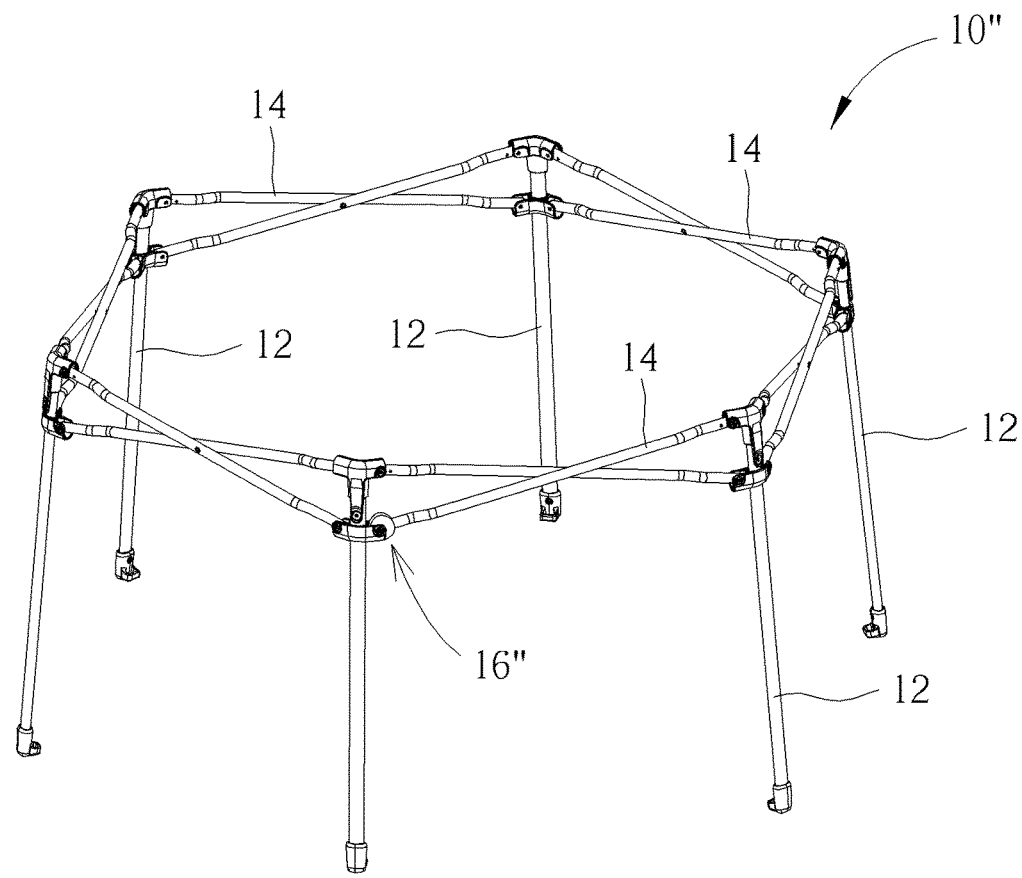
FIG. 18 is a diagram of the foldable playard according to a seventh embodiment of the present invention.
Figure 19:
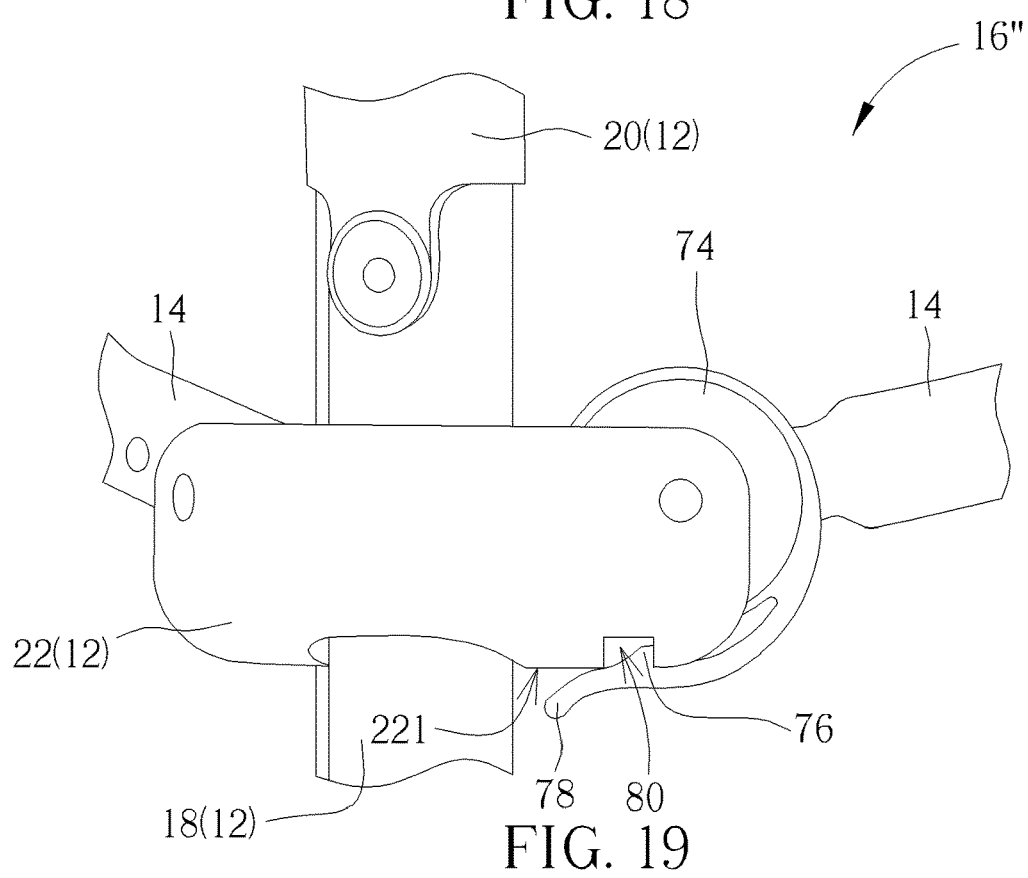
FIG. 19 is a diagram of a part of the foldable playard in the locking mode according to the seventh embodiment of the present invention.
Figure 20:
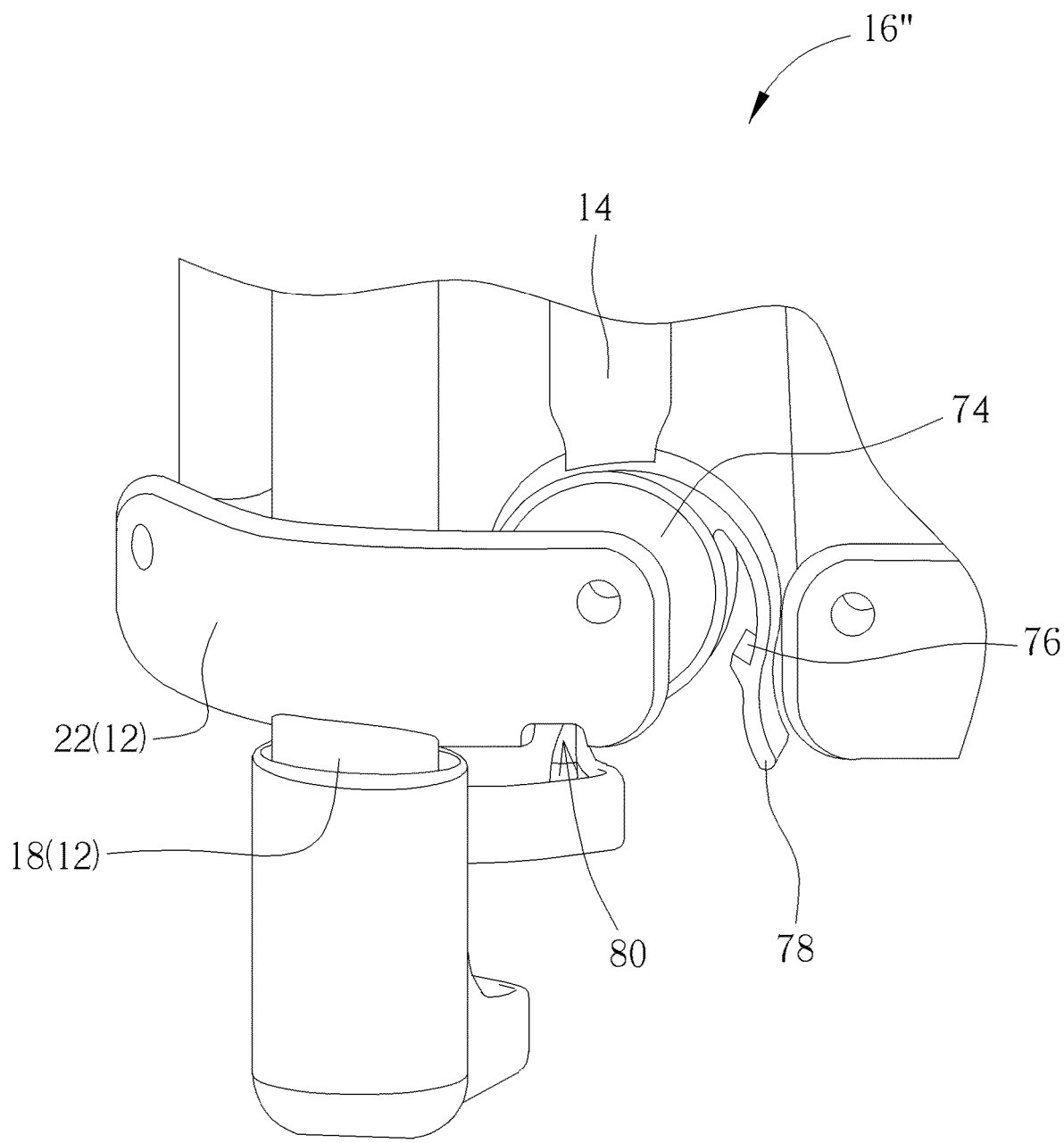
FIG. 20 is a diagram of a part of the foldable playard in the unlocking mode according to the seventh embodiment of the present invention.

Please refer to FIG. 18 to FIG. 20. FIG. 18 is a diagram of the foldable playard 10" according to a seventh embodiment of the present invention. FIG. 19 and FIG. 20 are diagrams of a part of the foldable playard 10" in different operation modes according to the seventh embodiment of the present invention. In the seventh embodiment, elements having the same numerals have the same structures and functions as the foresaid embodiments, and a detailed description is omitted herein for simplicity. The foldable playard 10" can include the latching mechanism 16" disposed on the connection between the X-typed frame 14 and the slider 22. The latching mechanism 16" can include a latch body 74, a locking portion 76 and a releasing portion 78.

The latch body 74 can be affixed to the X-typed frame 14 and rotatably assembled with the slider 22 of the vertical tube 12. The locking portion 76 can be stretched from the latch body 74, and the releasing portion 78 can be disposed on a front end of the locking portion 76. Besides, a notch 80 can be formed on a bottom surface 221 of the slider 22. As shown in FIG. 19, the latch body 74 can be rotated in the clockwise direction to engage the locking portion 76 with the notch 80 of the slider 22, so that the X-typed frame 14 cannot be rotated relative to the vertical tube 12 for fixing the foldable playard 10" in the unfolded mode. As shown in FIG. 20, the releasing portion 78 can be pressed by the external force to bend the latch body 74, so the locking portion 76 is flexible and can be deformed to disengage from the notch 80 of the slider 22, and the X-typed frame 14 can be rotated relative to the vertical tube 12 in the counterclockwise direction for folding the foldable playard 10".

Figure 21:
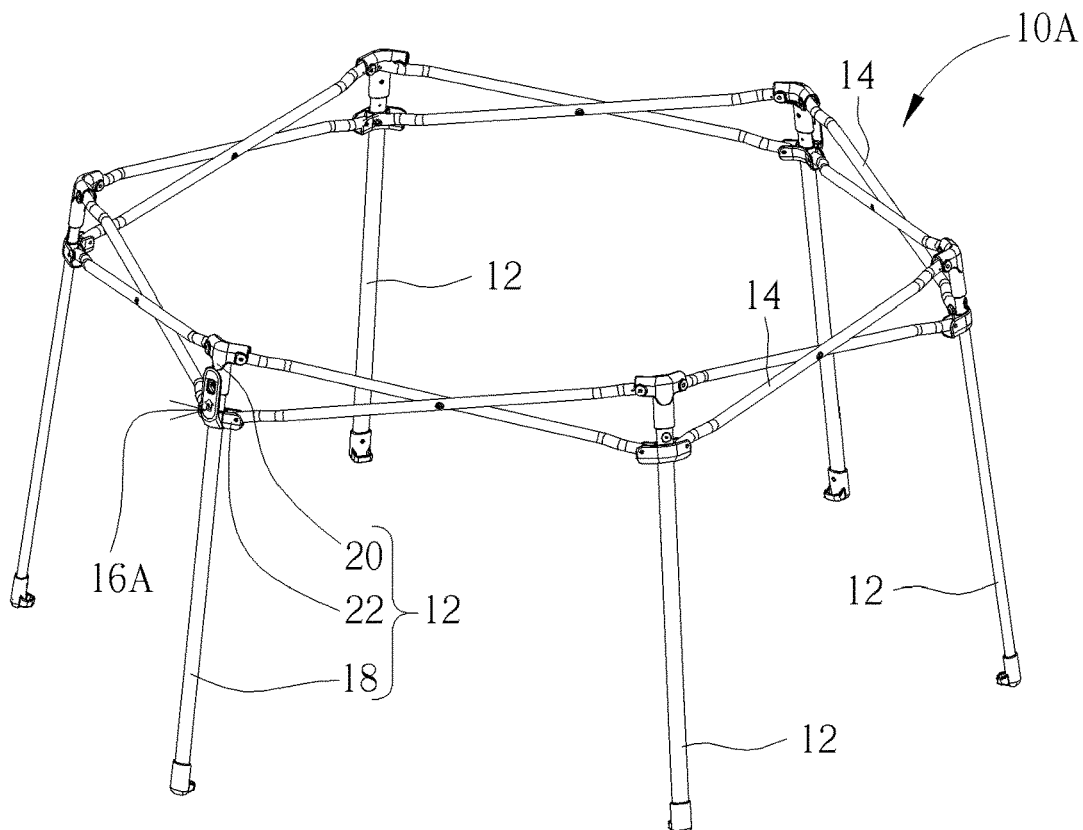
FIG. 21 is a diagram of the foldable playard according to an eighth embodiment of the present invention.
Figure 22:
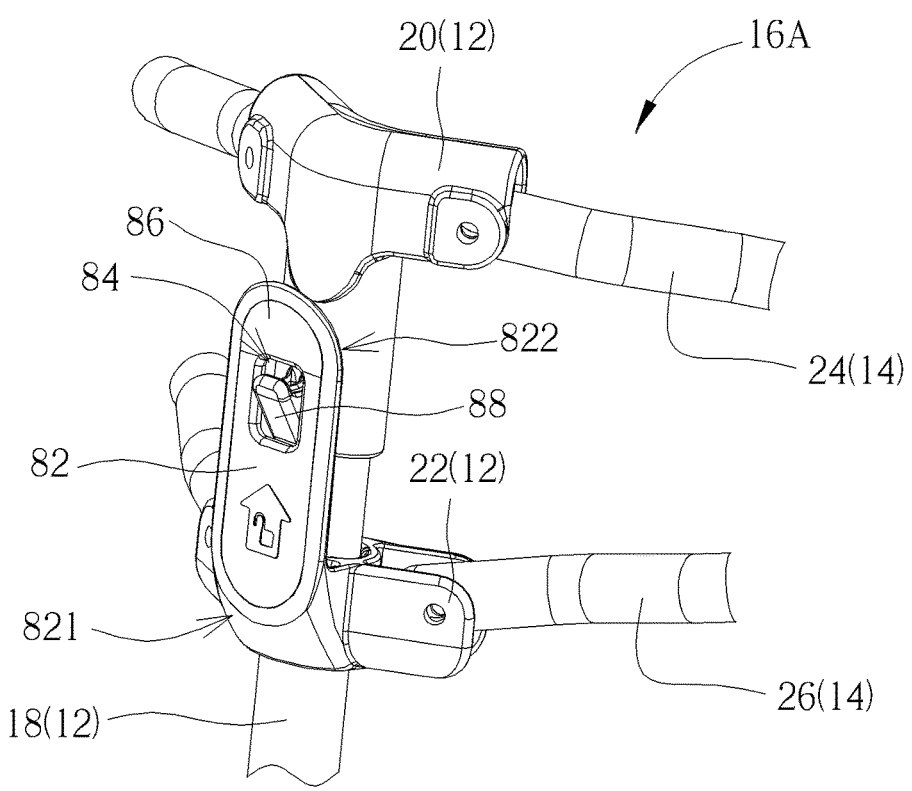
FIG. 22 is a diagram of a part of the foldable playard according to the eighth embodiment of the present invention.

Please refer to FIG. 21 and FIG. 22. FIG. 21 is a diagram of the foldable playard 10A according to an eighth embodiment of the present invention. FIG. 22 is a diagram of a part of the foldable playard 10A according to the eighth embodiment of the present invention. In the eighth embodiment, elements having the same numerals have the same structures and functions as the foresaid embodiments, and a detailed description is omitted herein for simplicity. The foldable playard 10A can include the latching mechanism 16A disposed on the slider 22 and used to engage with the corner 20 of the vertical tube 12.

The latching mechanism 16A can include a latch body 82, a locking portion 84 and a releasing portion 86. The latch body 82 can have a first end 821 and a second end 822 opposite to each other. The first end 821 can be affixed to the slider 22 of the vertical tube 12, and the second end 822 can be a free end of the latch body 82. The locking portion 84 can be disposed on the second end 822 and used to assemble with a locked portion 88 disposed on the corner 20. The releasing portion 86 can be disposed on the second end 822 and connected to the locking portion 84. As shown in FIG. 22, the locking portion 84 can be designed as a notch and the locked portion 88 can be designed as a protrusion engaged with the foresaid notch; however, the locking portion 84 may be shaped as the protrusion and the locked portion 88 may be shaped as the notch, which depends on design demand.

As shown in FIG. 21 and FIG. 22, when the locking portion 84 is locked with the locked portion 88, the slider 22 cannot be slid downward, and the inner member 24 and the outer member 26 cannot be rotated relative to each other, so the foldable playard 10A can be fixed in the unfolded mode. If the releasing portion 86 is pressed by the external force to bend and deform the latch body 82, the locking portion 84 can be separated from the locked portion 88, and the slider 22 can be slid downward, and the inner member 24 can be rotated relative to the outer member 26 into the nearly parallel mode, so as to fold the foldable playard 10A.

Figure 23:
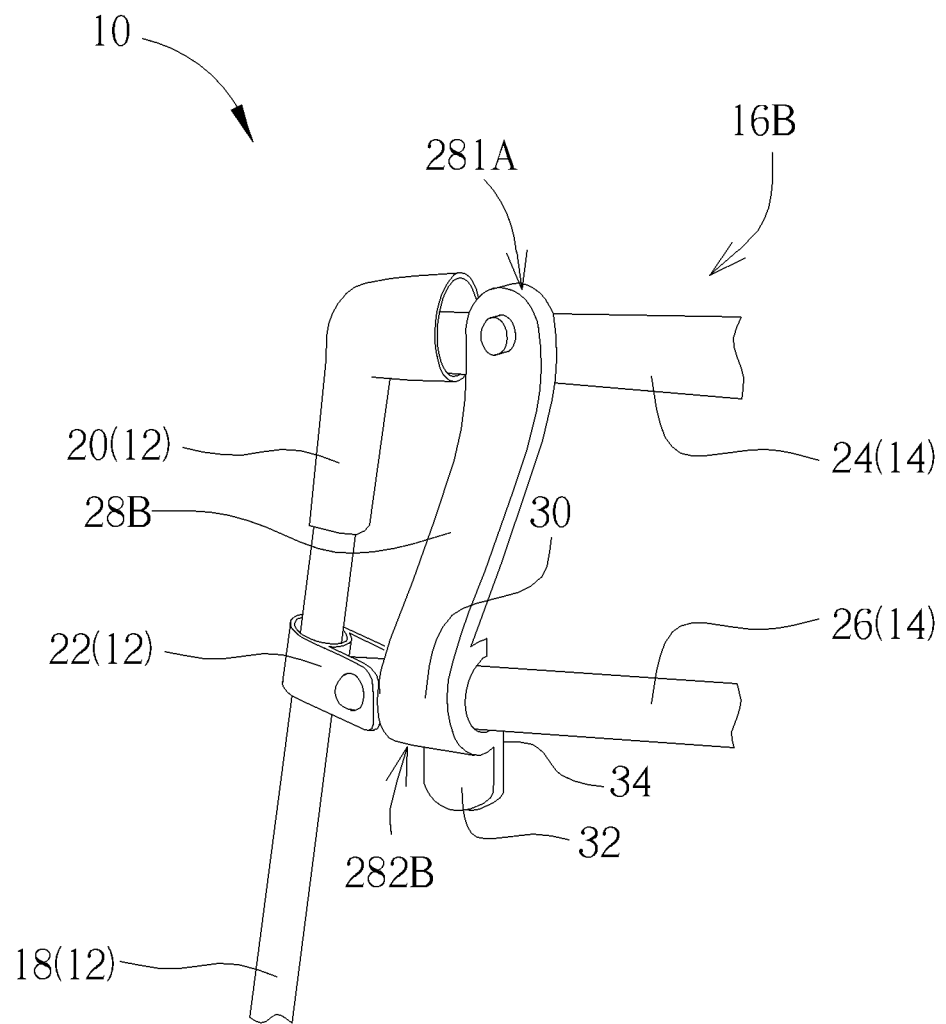
FIG. 23 is a diagram of a part of the foldable playard according to a ninth embodiment of the present invention.

Please refer to FIG. 23. FIG. 23 is a diagram of a part of the foldable playard 10 according to a ninth embodiment of the present invention. In the ninth embodiment, elements having the same numerals have the same structures and functions as the foresaid embodiments, and a detailed description is omitted herein for simplicity. The foldable playard 10 can include the plurality of vertical tubes 12, the plurality of X-typed frames 14 and a latching mechanism 16B. The latching mechanism 16B can include a latch body 28B, the locking portion 30, the releasing portion 32 and the lead-in portion 34. The latch body 28B can include a first end 281B and a second end 282B opposite to each other. The first end 281B can be disposed on the inner member 24 of one X-typed frame 14. The locking portion 30 can be disposed on the second end 282B, and used to engage with the outer member 26 of the X-typed frame 14 in a detachable manner. As the external force is applied to the releasing portion 32, the latch body 28 can be bent to disengage the locking portion 30 from the outer member 26, and the slider 22 can be downward slid to fold the foldable playard 10. As the slider 22 is slid upward relative to the bar member 18, the lead-in portion 34 can push and bend the latch body 28B, so as to align the locking portion 30 with the outer member 26; then, the locking portion 30 can be pressed to lock with the outer member 26, for fixing the foldable playard 10 in the unfolded mode.

Structural relation between the vertical tube and the X-typed frame in the unfolded mode and the parallel mode shown in FIG. 10 and FIG. 24 are suitable for all embodiments of the foldable playard in the present invention. Arrangement of the latching mechanism of each embodiment can be different from the latching mechanism of other embodiments in accordance with the design demand. In the first embodiment, the foldable playard disposes the latching mechanism on the corner of the vertical tube, and the latching mechanism can be bent and deformed to utilize the arc structure of the locking portion to engage with and disengage from the X-typed frame. In the second embodiment, the foldable playard disposes the latching mechanism on the corner of the vertical tube for engaging with and disengaging from the X-typed frame; however, the locking portion of the latching mechanism can be shaped as the hook structure, rather than the arc structure in the first embodiment. In the third embodiment, the foldable playard disposes the latching mechanism on the corner of the vertical tube for engaging with and disengaging from the X-typed frame, and the latch body of the latching mechanism can be bent and deformed to engage with and disengage from the locking portion and the X-typed frame, which means the cavity of the locking portion can lock or unlock the extrusion of the X-typed frame.

In the fourth embodiment, the foldable playard disposes the latching mechanism on the corner of the vertical tube, and the latch body of the latching mechanism can be rotated and utilize the crook structure of the locking portion to engage with and disengage from the X-typed frame. In the fifth embodiment, the foldable playard disposes the latching mechanism on the X-typed frame, to lock and unlock rotation between the inner member and the outer member of the X-typed frame, so as to unfold and fold the foldable playard. In the sixth embodiment, the foldable playard disposes the latching mechanism on the X-typed frame for engaging with and disengaging from the vertical tube, and the latch body of the latching mechanism is slidably disposed inside the X-typed frame.

In the seventh embodiment, the foldable playard disposes the latching mechanism on the X-typed frame for engaging with and disengaging from the vertical tube, and the latch body of the latching mechanism is rotatably disposed on the X-typed frame. In the eighth embodiment, the foldable playard disposes the latching mechanism on the slider for engaging with and disengaging from the corner of the vertical tube, so as to constrain or release constraint between the slider and the corner. In the ninth embodiment, the foldable playard disposes the latching mechanism on one member of the X-typed frame, and the latching mechanism can be engaged with another member of the X-typed frame to constrain rotation of the X-typed frame and the movement of the slider relative to the bar member. In conclusion, the latching mechanism of the present invention can provide a simple and easy-to-operate function for the foldable playard, and the latching mechanism can provide a safe and effective operation for folding and unfolding the foldable playard.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A foldable playard, comprising:
    a plurality of vertical tubes, each vertical tube comprising:
        a bar member;
        a corner affixed to a top of the bar member; and
        a slider movably translated along the bar member;
    a plurality of X-typed frames, each of the X-typed frames comprising a pair of frame members connected between two adjacent vertical tubes via the corner and the slider, each frame member having a first end rotatably connected to the corner and a second end rotatably connected to the slider of the two adjacent vertical tubes; and
    a latching mechanism, comprising:
        a latch body, comprising a first end and a second end opposite to each other, the first end being disposed on the corner of one vertical tube; and
        a locking portion disposed on the second end, the locking portion having an engaging surface to selectively directly contact and disengage from a selected frame member of the X-typed frame in response to motion of the latch body, the engaging surface directly contacts the selected frame member at a location along the selected frame member that is adjacent to the rotatable connection between the second end of the selected frame member and the slider.

2. The foldable playard of claim 1, wherein the latch body is a flexible latch affixed to the corner, and engagement and disengagement of the engaging surface of the locking portion and the said selected frame member of the X-typed frame is actuated by deformation of the flexible latch.

3. The foldable playard of claim 2, wherein the engaging surface of the locking portion is an arc structure, and a dimension of the arc structure is matched with a diameter of the frame members of the X-typed frame.

4. The foldable playard of claim 1, wherein the engaging surface of the locking portion is a hook structure adapted to hold a bottom surface of the said selected frame member of the X-typed frame.

5. The foldable playard of claim 1, wherein the latch body is a rotatable latch pivoted to the corner, engagement and disengagement of the engaging surface of the locking portion and the said selected frame member of the X-typed frame is actuated by rotation of the rotatable latch.

6. The foldable playard of claim 5, wherein the locking portion is a crook structure adapted to catch the said selected frame member of the X-typed frame.

7. The foldable playard of claim 1, wherein the latching mechanism further comprises a releasing portion disposed on the second end and adapted to be applied by an external force for actuating the latch body.

8. The foldable playard of claim 1, wherein the latching mechanism further comprises a lead-in portion connected to the locking portion and adapted to slidably and selectively contact against the selected frame member of the X-typed frame for bending the latch body.

9. The foldable playard of claim 1, wherein the locking portion comprises a first locking structure, and the selected frame member of the X-typed frame comprises a second locking structure detachably locking with the first locking structure.

10. The foldable playard of claim 9, wherein the first locking structure is a cavity and the second locking structure is an extrusion, or the first locking structure is the extrusion and the second locking structure is the cavity.

11. The foldable playard of claim 1, wherein the engaging surface of the locking portion selectively directly contacts and disengages from an outer side surface of the selected frame member of the X-typed frame.

* * * * *